(12) United States Patent
Miyazawa

(10) Patent No.: US 6,831,393 B2
(45) Date of Patent: Dec. 14, 2004

(54) LINEAR ACTUATOR

(75) Inventor: Osamu Miyazawa, Shimosuwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/379,429

(22) Filed: Mar. 4, 2003

(65) Prior Publication Data
US 2004/0090146 A1 May 13, 2004

(30) Foreign Application Priority Data

Mar. 4, 2002 (JP) ........................................ 2002-058072

(51) Int. Cl.$^7$ .............................................. H02N 2/04
(52) U.S. Cl. ............................ 310/323.14; 310/323.02; 310/323.09; 310/328; 310/12
(58) Field of Search ....................... 310/323.01, 323.02, 310/323.09, 323.14, 323.17, 328, 12

(56) References Cited

U.S. PATENT DOCUMENTS

| | | | |
|---|---|---|---|
| 5,039,899 A | * 8/1991 | Yamaguchi | 310/323.16 |
| 5,087,851 A | * 2/1992 | Nakazawa et al. | 310/323.16 |
| 5,132,582 A | * 7/1992 | Hayashi et al. | 310/323.16 |
| 5,191,688 A | * 3/1993 | Takizawa et al. | 29/25.35 |
| 5,416,375 A | * 5/1995 | Funakubo et al. | 310/323.16 |
| 5,532,540 A | * 7/1996 | Claeyssen et al. | 310/323.16 |
| 5,548,176 A | * 8/1996 | Oda | 310/328 |
| 5,616,980 A | * 4/1997 | Zumeris | 310/323.16 |
| 5,777,423 A | * 7/1998 | Zumeris | 310/316.01 |
| 5,852,336 A | * 12/1998 | Takagi | 310/323.01 |
| 6,064,140 A | * 5/2000 | Zumeris | 310/323.02 |
| 6,091,179 A | * 7/2000 | Tobe et al. | 310/328 |
| 6,242,846 B1 | * 6/2001 | Ashizawa et al. | 310/323.02 |

FOREIGN PATENT DOCUMENTS

| | | | |
|---|---|---|---|
| EP | 0755 054 | 7/1996 | ........... G11B/19/20 |
| JP | 02-041673 | 2/1990 | ........... H02N/2/00 |
| JP | 6-6101 | 1/1994 | ........... A61B/1/00 |
| JP | 6-6989 | * 1/1994 | ................... 310/12 |
| JP | 06-233560 | 8/1994 | ........... H02N/2/00 |
| JP | 07-184382 | 7/1995 | ........... H02N/2/00 |
| JP | 08-237970 | 9/1996 | ........... H02N/2/00 |
| JP | 08-237971 | 9/1996 | ........... H02N/2/00 |
| JP | 9-37575 | 2/1997 | ........... H02N/2/00 |
| JP | 10-080162 | 3/1998 | ........... H02N/2/00 |
| JP | 2001-016879 | 1/2001 | ........... H02N/2/00 |

* cited by examiner

Primary Examiner—Thomas M. Dougherty
(74) Attorney, Agent, or Firm—Harness, Dickey & Pierce, P.L.C.

(57) ABSTRACT

A linear actuator is an actuator for directly driving (moving) a slider. The linear actuator has an actuator unit constituted by the slider and an actuator body on which the slider is movably provided for linear movement. The actuator body has a base, a vibrating element for moving the slider, two rollers to movably support the slider, pushing means for pushing the vibrating element into contact with the slider, and a conducting circuit for conducting each of electrodes of the vibrating element by selecting a conducting pattern to each of the electrodes. Grooves are respectively formed in outer circumferential surfaces of the rollers, and the slider is arranged inside each of the grooves.

20 Claims, 17 Drawing Sheets

LINEAR ACTUATOR

TECHNICAL FIELD

The present invention is related to a linear actuator.

BACKGROUND ART

Japanese Laid-Open Patent Publication No. HEI 7-184382 discloses a mechanism in which a slider is movably provided with respect to a shaft, and an AC voltage is applied to a piezoelectric element of a vibrating element (micromotor) to vibrate the vibrating element, whereby such vibration applies force to the slider to move the slider along the shaft.

However, in this mechanism, because frictional driving is carried out by pushing force applied to the slider from the vibrating element, the frictional resistance between the slider and the shaft increases and there are large losses depending on such pushing force, and there are cases where the slider can not move because the frictional resistance is too large.

SUMMARY OF THE INVENTION

It is an object of the present invention to provide a linear actuator having a simple structure which has the advantage of being compact, and particularly thin, and which makes it possible to smoothly and reliably move a slider.

In order to achieve the above-mentioned object, a linear actuator of the present invention has at least one actuator unit. The actuator unit comprising: a slider; a plurality of rollers for movably supporting the slider; and a vibrating element abutting on the slider to make frictional contact with the slider, the vibrating element having at least one piezoelectric element; wherein the vibrating element is vibrated when an AC voltage is applied to the at least one piezoelectric element so that the vibration repeatedly applies force to the slider to move the slider lineally.

Thus, it is possible to reduce the frictional resistance, and this makes it possible to linearly move the slider smoothly and reliably. Further, by using a vibrating element to move the slider, namely, by using a vibrating element to linearly drive the slider, the entire linear actuator can be made compact and particularly thin. Also, the structure of the linear actuator can be simplified, and this makes it possible to reduce the manufacturing cost. Further, because an ordinary motor is not used, it is possible to completely eliminate electromagnetic noise, or even when there is electromagnetic noise, because such noise is small, it is possible to prevent such noise from having an effect on its peripheral devices.

In the linear actuator of the present invention, it is preferred that the at least one actuator unit includes a plurality of actuator units.

In the linear actuator of the present invention, it is preferred that the plurality of actuator units are respectively provided in substantially parallel planes in a stacked arrangement.

In the linear actuator of the present invention, it is preferred that the linear actuator further comprises: at least one common shaft for rotatably supporting the rollers of the actuator units; and at least one common shaft for supporting the vibrating elements of the actuator units.

In the linear actuator of the present invention, it is preferred that the vibrating element has vibrating patterns which comprise a plurality of vibrating modes including a first mode in which the slider is maintained in a suspended state; a second mode in which the slider is allowed to be moved; a third mode in which the slider is moved in a forward direction; and a fourth mode in which the slider is moved in a reverse direction, wherein any one mode can be selected from the first mode, the second mode, the third mode, and the fourth mode by changing the vibrating pattern of the vibrating element.

In the linear actuator of the present invention, it is preferred that the vibrating element has vibrating patterns which comprise a plurality of vibrating modes including a first mode in which the slider is maintained in a suspended state; a second mode in which the slider is allowed to be moved; a third mode in which the slider is moved in a forward direction; and a fourth mode in which the slider is moved in a reverse direction, and the vibrating element has a plurality of divided electrodes so that the vibrating element is vibrated when an AC voltage is applied to the at least one piezoelectric element through the electrodes, wherein any one mode can be selected from the first mode, the second mode, the third mode, and the fourth mode by changing patterns of application of the AC voltage to each of the electrodes of the vibrating element.

In the linear actuator of the present invention, it is preferred that the linear actuator further comprises at least one shaft positioned at the center of the corresponding roller for rotatably supporting the roller, wherein the slider is positioned in the groove to be supported by the roller, and the diameter of the shaft is smaller than a portion of the roller on which the slider is supported.

In the linear actuator of the present invention, it is preferred that the slider has a sliding portion and the sliding portion is rod-shaped or plate-shaped.

In the linear actuator of the present invention, it is preferred that the vibrating element is plate-shaped, and the vibrating element and the slider are positioned in a substantially same plane.

In the linear actuator of the present invention, it is preferred that the vibrating element is constituted from a laminated body which includes the at least one plate-shaped piezoelectric element and at least one reinforcing plate made of metal material.

In the linear actuator of the present invention, it is preferred that the vibrating element has an arm portion projectingly provided from the vibrating element to support the vibrating element, the vibrating element is pushed into contact with the slider by the arm portion, the vibrating element has a portion abutting on the slider, and the arm portion and the abutting portion are formed integrally on the reinforcing plate.

In the linear actuator of the present invention, it is preferred that the linear actuator further comprises pushing means for pushing the vibrating element into contact with the slider; wherein the vibrating element has an arm portion projectingly provided from the vibrating element to support the vibrating element, the vibrating element has a portion abutting on the slider, and at least a part of the pushing means, the arm portion, and the abutting portion are formed integrally on the reinforcing plate.

In the linear actuator of the present invention, it is preferred that the pushing means has an adjustment mechanism that adjusts force pushing the vibrating element against the slider, and at least a part of the adjustment mechanism is formed integrally on the reinforcing plate.

In the linear actuator of the present invention, it is preferred that the vibrating element has a portion abutting on the slider, the abutting portion is positioned between two rollers of the plurality of rollers in a direction of movement of the slider.

In the linear actuator of the present invention, it is preferred that the slider has a resonance frequency of bending vibration, and the linear actuator is constructed so that there is substantially no match between the resonance frequency of the bending vibration of the slider and the m'th multiple of the frequency of the vibration of the vibrating element (where m is all of the natural numbers), and that there is substantially no match between the n'th multiple of the resonance frequency of the bending vibration of the slider and the frequency of the vibration of the vibrating element (where n is all of the natural numbers).

In the linear actuator of the present invention, it is preferred that the linear actuator further comprises movement restricting means for restricting movement of the slider.

In the linear actuator of the present invention, it is preferred that the movement restricting means is provided on the slider, and includes at least one protruding portion that restricts the movement of the slider by abutting on the roller.

BRIEF DESCRIPTION OF THE DRAWINGS

The preferred embodiments of the rotation/displacement converting actuator are described below with reference to the appended drawings.

PREFERRED EMBODIMENTS OF THE INVENTION

The preferred embodiments of the linear actuator of the present invention will be described below with reference to the appended drawings.

Figure 1:
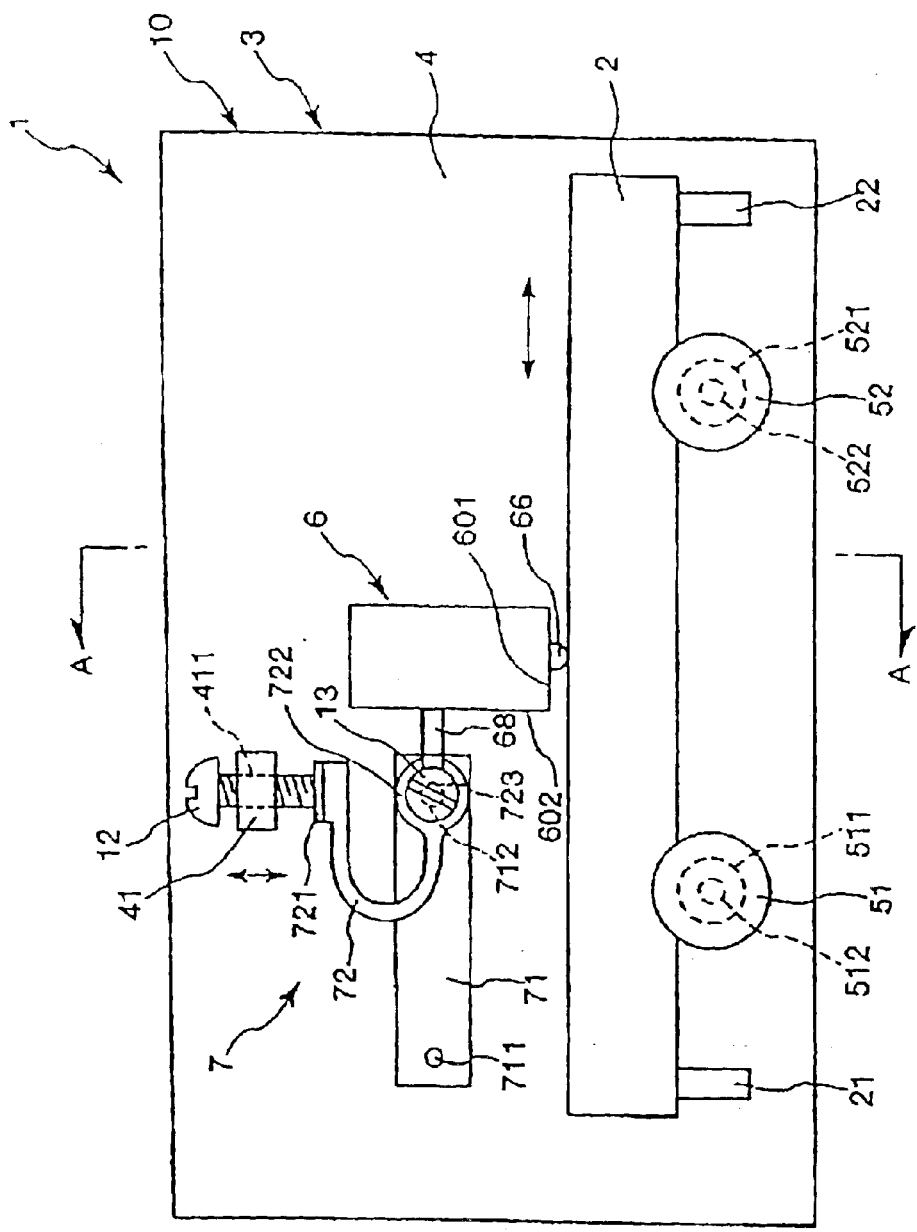
FIG. 1 is a plan view showing a first embodiment of a linear actuator according to the present invention.
Figure 2:
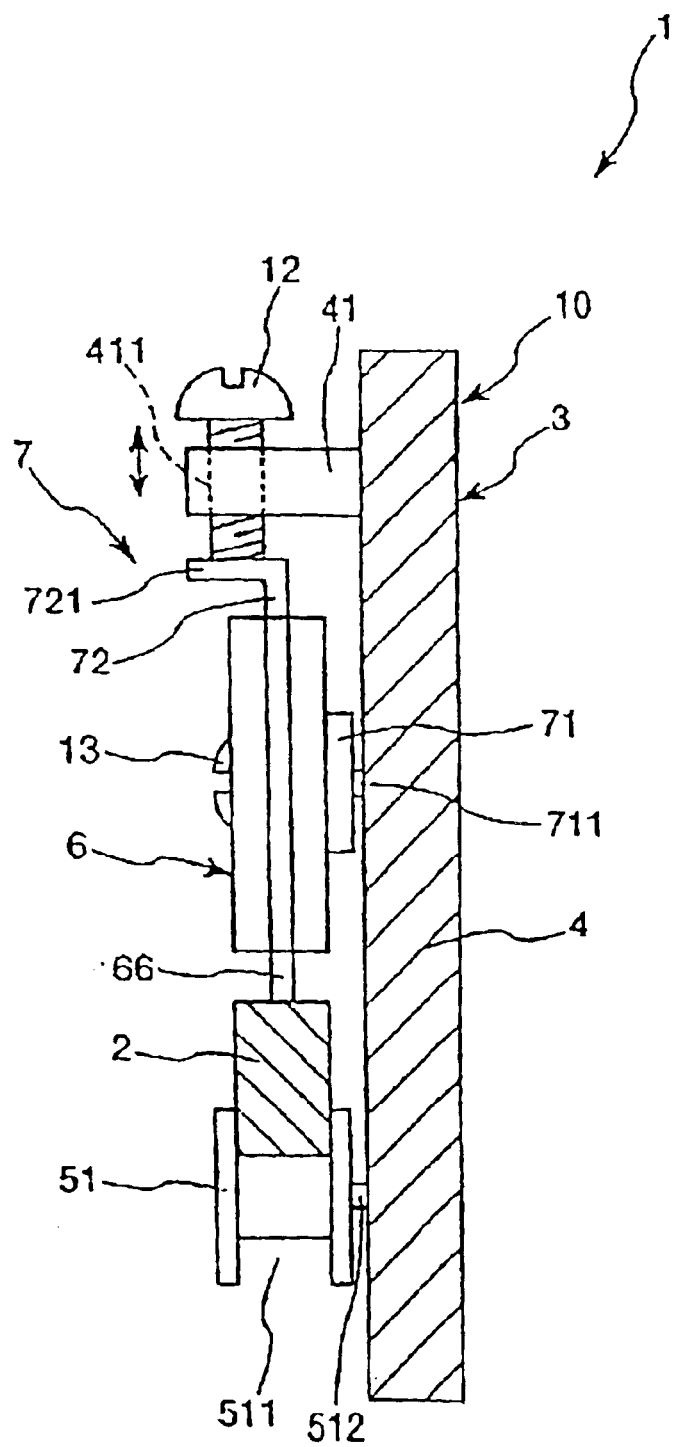
FIG. 2 is a cross-sectional view taken along the line A—A of the linear actuator shown in FIG. 1.
Figure 3:
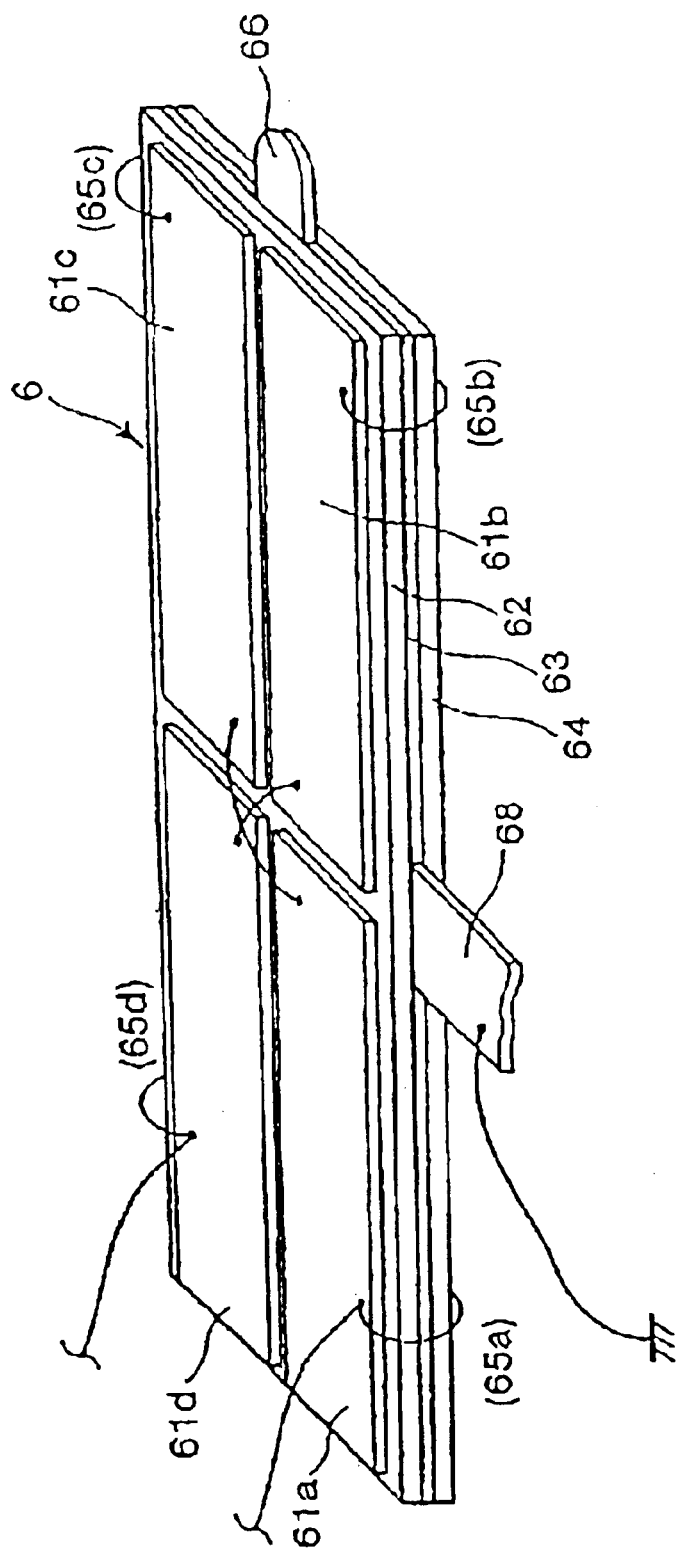
FIG. 3 is a perspective view of a vibrating element in the linear actuator shown in FIG. 1.
Figure 4:
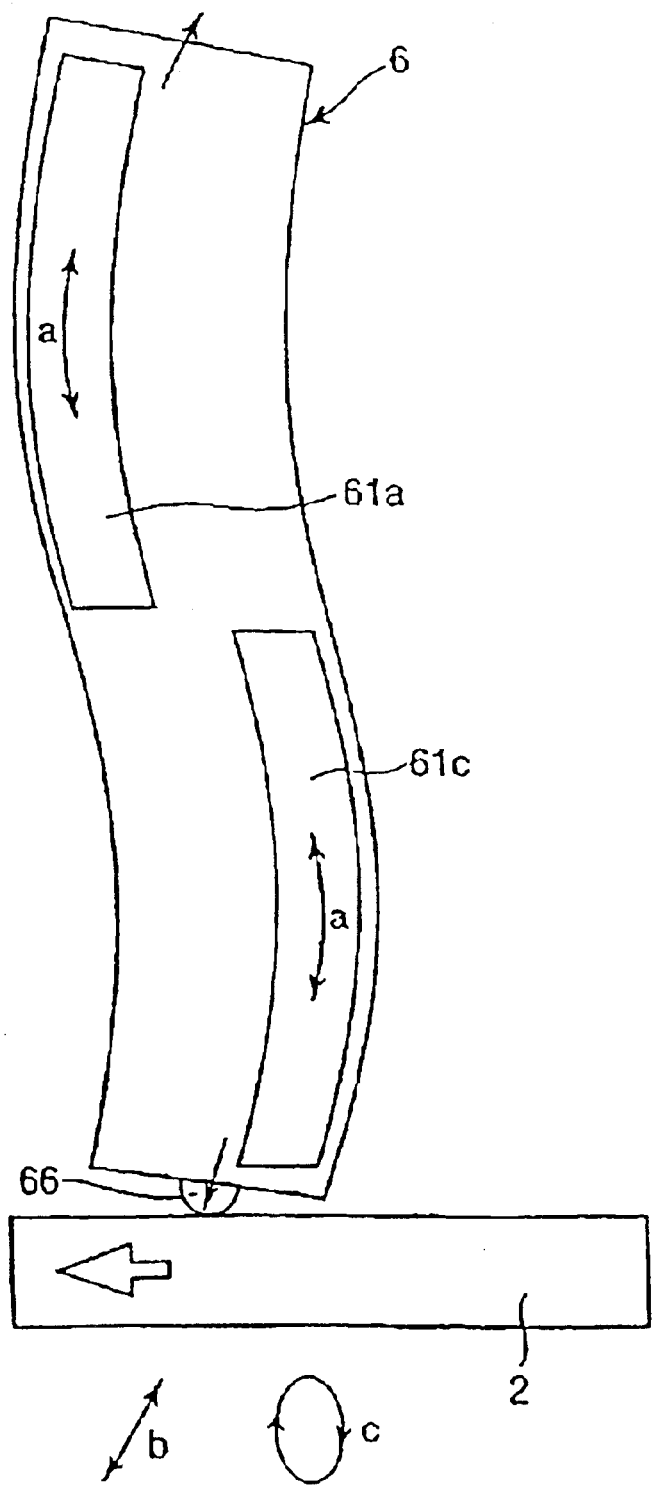
FIG. 4 is a plan view showing the vibration state of the vibrating element in the linear actuator shown in FIG. 1.
Figure 6:
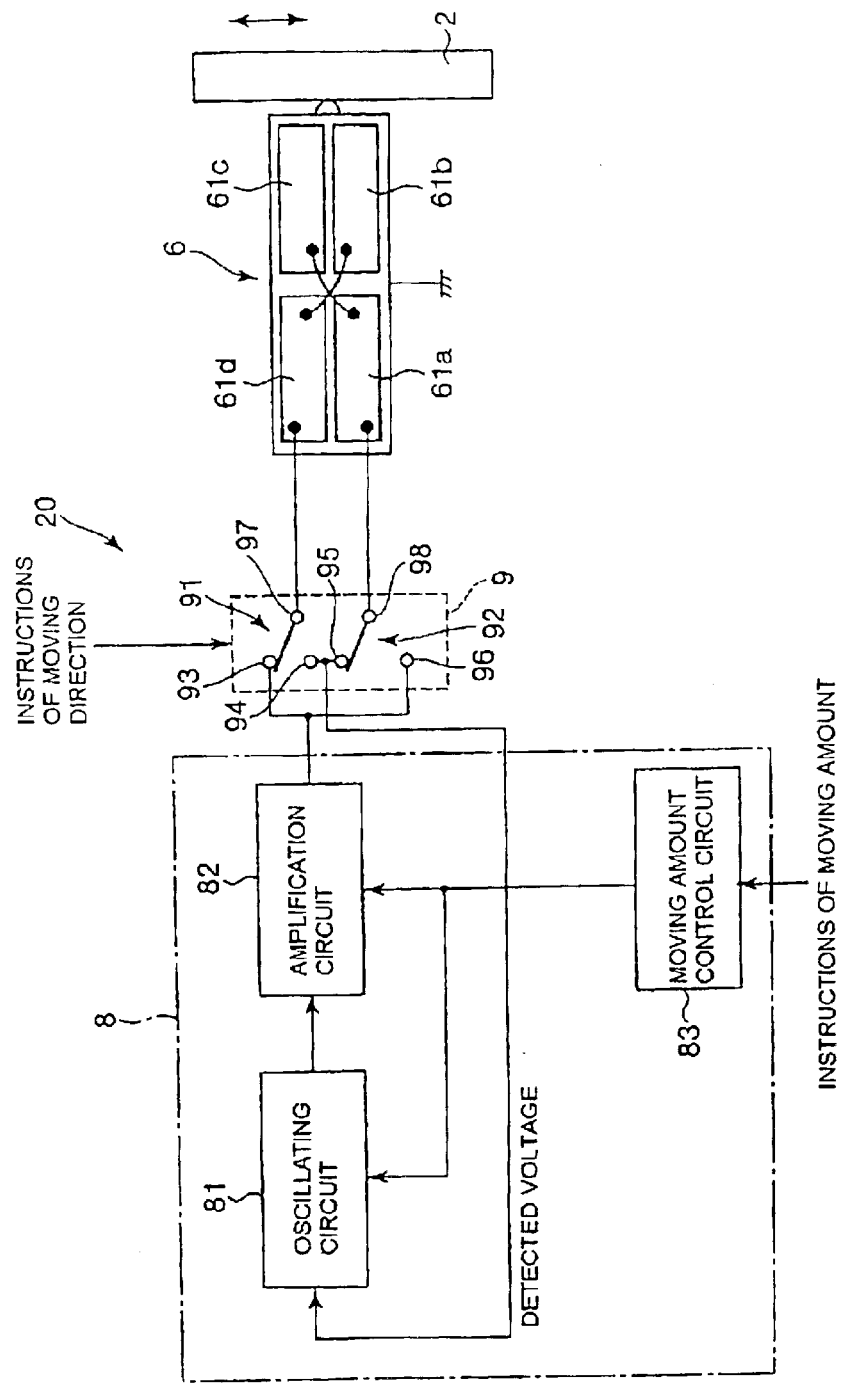
FIG. 6 is a block diagram showing a circuit configuration of the linear actuator shown in FIG. 1.

FIG. 1 is a plan view showing a first embodiment of a linear actuator according to the present invention. FIG. 2 is a cross-sectional view taken along the line A—A of the linear actuator shown in FIG. 1. FIG. 3 is a perspective view of a vibrating element in the linear actuator shown in FIG. 1. FIGS. 4 and. 5 are plan views respectively showing the vibration states of the vibrating element in the linear actuator shown in FIG. 1. FIG. 6 is a block diagram showing a circuit configuration of the linear actuator shown in FIG. 1. Here, in following explanations using FIG. 1, the upper side in FIG. 1 is referred to as "upper", the lower side is referred to as "lower", the right side is referred to as "right", and the left side is referred to as "left".

A linear actuator 1 shown in these drawings is an actuator that directly drives (moves) a slider 2, and includes a plate-shaped actuator unit 10 that is constructed by the slider 2 and an actuator body 3 on which the slider 2 is provided for linear movement.

As shown in FIGS. 1, 2 and 6, the actuator body 3 includes a plate-shaped base (base plate) 4, a vibrating element 6 which makes frictional contact with the slider 2 to move the slider 2, two rollers 51 and 52 which make rolling contact with the slider 2 to movably support the slider 2, pushing means 7 which pushes the vibrating element 6 against the slider 2, and a conducting circuit 20 which selects a conducting pattern to each of electrodes (described later) of the vibrating element 6, and conducts electricity to such electrodes.

The slider 2 is a rigid body, namely, a movable body (driven body) having moderate rigidity. The shape of the slider 2 has no particular limitation, but the sliding portion of the slider 2 preferably has a rod shape, a plate shape or the like, for example, and in particular, the portion (contact portion) which makes contact with a protruding portion 66 (described later) of the vibrating element 6 is preferably flat.

By making such contact portion of the slider 2 flat, it is possible to prevent slippage of the engagement in the thickness direction when the slider 2 is pushed against the protruding portion 66 of the vibrating element 6.

In the present embodiment, the slider 2 has a rod shape in which the shape of a horizontal cross section thereof has a square shape, namely, the slider 2 is formed as a long substantially rectangular parallelepiped, and is arranged to be movable in the longitudinal direction (axial direction) thereof.

Two protruding portions 21 and 22 (movement restricting means) are formed on the slider 2 to make contact with the rollers 51 and 52 (described later) to restrict the movement of the slider 2.

The protruding portion 21 is at the lower side of the slider 2 in FIG. 1, and is positioned at the left side from the roller 51, namely, at the left side end portion, and the protruding portion 22 is at the lower side of the slider 2 in FIG. 1, and is positioned at the right side from the roller 52, namely, at the right side end portion.

In this regard, the number and positions of such protruding portions are not limited to these, and the protruding portions may be arranged between the roller 51 and the roller 52, for example, and just one protruding portion may be provided.

The vibrating element 6 is formed to have a plate shape, and is arranged on one surface (the left side in FIG. 2) of the base 4 in a posture parallel with the base 4. Further, the vibrating element 6 will be described in detail later.

The rollers 51 and 52 are supported on one of the surfaces (the left side in FIG. 2) of the base 4 in postures parallel with the base 4 respectively by shafts 512 and 522 respectively positioned at the centers of the rollers 51, 52 to enable rotation in the forward and reverse directions.

Grooves 511 and 521 are respectively formed in the circumferential surfaces (outer circumferential surfaces) of the rollers 51 and 52 along the outer circumferences thereof.

The roller 51 and the roller 52 are arranged on a line in the right-and-left direction (i.e., the roller 51 is at the left side, and the roller 52 is at the right side) with a given spacing therebetween, and the slider 2 is arranged (positioned) inside the groove 511 of the roller 51 and inside the groove 521 of the roller 52.

In this regard, the diameter (diameter) of the shaft 512 of the roller 51 is preferably set to be smaller than the diameter of the portion (bottom portion of the groove 511) of the roller 51 which supports the slider 2, and in the same way, the diameter of the shaft 522 of the roller 52 is preferably set to be smaller than the diameter of the portion (bottom portion of the groove 521) of the roller 52 which supports the slider 2.

In this way, it is possible to reduce the rolling resistance of the rollers 51 and 52, and this makes it possible to move the slider 2 more smoothly and reliably.

Further, the vibrating element 6 is arranged at the upper side of the slider 2, namely, at the upper side of both the rollers 51 and 52 so that the protruding portion 66 is arranged to be positioned between the roller 51 and the roller 52 in the direction of movement of the slider 2. The vibrating element 6 is arranged in a posture in which a short side 601 of the vibrating element 6 is substantially parallel with the direction of movement of the slider 2, namely, a posture in which a long side 602 of the vibrating element 6 is substantially vertical to the direction of movement of the slider 2, wherein a tip portion of the protruding portion 66 thereof abuts on the slider 2 from the upper side.

When the vibrating element 6 and the rollers 51 and 52 are viewed from the bottom side in FIG. 1, they are all arranged so as to be positioned on a substantially same line. Namely, the vibrating element 6 and the slider 2 are arranged substantially parallel, and are positioned in the substantially same plane. Thus, there is the particular advantage of making the entire linear actuator 1 thin.

The pushing means 7 is provided so as to be capable of rotation (displacement) around a shaft 711 with respect to the base 4. The pushing means 7 includes a supporting portion 71 that supports the vibrating element 6, and a biasing member 72 that biases the supporting portion 71 to the slider 2 side.

The supporting portion 71 is formed to have a substantially rectangular plate shape, and is supported on one of the surfaces (the left side in FIG. 2) of the base 4 so as to be capable of rotation by the shaft 711 at the left side end portion thereof in FIG. 1 in a posture parallel with the base 4. Further, a screw hole 712 into which a bolt 13 is screwed is formed in the right side end portion of the supporting portion 71 in FIG. 1.

The biasing member 72 has elasticity, and in its natural state it is a rod-shaped or plate-shaped element that is curved (bent) so that the left side thereof in FIG. 1 forms a convexity. The biasing member 72 is provided in a state that is bent more than such natural state, namely, in an elastic deformed state.

An abutting portion 721 that abuts on the tip portion of a bolt 12 is provided on the upper side end portion of the biasing member 72 in FIG. 1, and a substantially circular fixing portion 722 is provided on the lower side end portion of the biasing member 72 in FIG. 1. A hole 723 through which the bolt 13 is inserted is formed in the fixing portion 722.

In the present embodiment, the biasing member 72, the abutting portion 721, the fixing portion 722, and a reinforcing plate 63, an arm portion 68 and the protruding portion 66 of the vibrating element 6 (which are described later) are formed integrally (as one member).

Further, an attachment portion 41 that attaches the bolt 12 is projectingly provided on one of the surfaces (the left side in FIG. 2) of the base 4. A screw hole 411 into which the bolt 12 is screwed is formed in the attachment portion 41 along the vertical direction in FIG. 1.

As shown in FIG. 1, the vibrating element 6 is supported by the supporting portion 71 that is provided so as to be capable of rotation with respect to the base 4.

Namely, the vibrating element 6 is connected to the right side end portion of the supporting portion 71 in FIG. 1. In this case, the hole 723 of the fixing portion 722 is superposed on the screw hole 712, and the bolt 13 is inserted through the hole 723 and screwed into the screw hole 712 to fasten the bolt 13 thereto. Thus, the fixing portion 722 is fixed to the right side end portion of the support portion 71 in FIG. 1, and the vibrating element 6 is connected to the supporting portion 71.

Further, the supporting portion 71 and the vibrating element 6 are connected in a posture in which the longitudinal direction of the vibrating element 6 is substantially orthogonal to the longitudinal direction of the supporting portion 71.

In this way, the vibrating element 6 is supported by the supporting portion 71 on the arm portion 68 (i.e., via the arm portion 68).

As described later, because the arm portion 68 has elasticity (flexibility) and is relatively soft, the arm portion 68 has the function of reducing the constraint of the vibration of the vibrating element 6, and attenuating the vibration to the supporting portion 71. In other words, the arm portion 68 prevents the vibration of the vibrating element 6 from being absorbed (suppressed) to the supporting portion 71. Accordingly, the vibrating element 6 can vibrate freely with relatively large amplitude, and therefore, it is possible to move the slider 2 with high efficiency. Namely, the arm portion 68 has the function of facilitating the vibration of the vibrating element 6 against the supporting portion 71.

Further, the supporting portion 71 has higher rigidity than the arm portion 68, and is essentially a rigid body. In this regard, "essentially a rigid body" refers to the fact that the supporting portion 71 has rigidity high enough to make it possible to essentially ignore the elastic deformation of the supporting portion 71 in a state where the linear actuator 1 is used. In this way, it is possible to reliably maintain the posture of the vibrating element 6 even when the vibrating element 6 is vibrating. Accordingly, it is possible to prevent abnormal vibration of the vibrating element 6.

Furthermore, because the supporting portion 71 rotates around the shaft 711 that serves as a support point far from the protruding portion 66, it is possible to support the vibrating element 6 without tilting even when the protruding portion 66 is worn away. Accordingly, the characteristics of the linear actuator 1 can be maintained.

Further, the bolt 12 is screwed into the screw hole 411 of the attachment portion 41.

By fixing the fixing portion 722 with the bolt 13, the lower side end portion of the biasing member 72 in FIG. 1 is connected to the right side end portion of the supporting portion 71 in FIG. 1, whereby the abutting portion 721 provided on the upper side end portion in FIG. 1 abuts on (is locked at) the tip portion of the bolt 12. At this time, because a concave portion or hole (not shown in the drawings) is formed in the abutting portion 721, and the tip of the bolt 12 is pointed, it is possible to prevent the engagement between the abutting portion 721 and the bolt 12 from separating.

As described above, the biasing member 72 is provided in an elastic deformed state that is bent more than the natural state. Thus, the biasing member 72 exhibits force (elastic force) that attempts to return to the natural state, namely, force of restitution.

By providing this kind of structure, the biasing member 72 applies downward force in FIG. 1 against the right side end portion of the supporting portion 71 in FIG. 1. Namely, the biasing member 72 biases the supporting portion 71 in a direction in which the supporting portion 71 rotates clockwise in FIG. 1. In this way, the vibrating element 6 is also biased in the downward direction in FIG. 1, and the protruding portion 66 of the vibrating element 6 is pushed into contact with (is pushed against) the contact portion (the upper side surface in FIG. 1) of the slider 2. Namely, the biasing member 72 biases the supporting portion 71 in a direction in which the protruding portion 66 is pushed into contact with the slider 2 (i.e., a direction in which the supporting portion 71 is rotated clockwise in FIG. 1).

In other words, the slider 2 is sandwiched between (held between) the protruding portion 66 of the vibrating element 6 and the rollers 51 and 52 by the pushing force of the pushing means 7.

In this way, the biasing force of the biasing member 72 pushes the protruding portion 66 of the vibrating element 6 into contact with the contact portion of the slider 2 (i.e., the protruding portion 66 of the vibrating element 6 makes frictional contact with the contact portion of the slider 2), whereby sufficient frictional force is obtained between the protruding portion 66 and the contact portion.

At this time, the arm portion 68 becomes in a slightly bent state by the biasing force of the biasing member 72.

Further, the biasing force of the biasing member 72 can be adjusted by operating the bolt 12.

Namely, when an operation in which the bolt 12 is rotated in a given direction is carried out, the bolt 12 moves downward in FIG. 1, and the abutting portion 721 of the biasing member 72 also moves downward in FIG. 1, whereby the biasing member 72 is further bent (i.e., the degree of curvature is increased). Thus, the biasing force of the biasing member 72 is increased.

On the other hand, when an operation in which the bolt 12 is rotated in the opposite direction is carried out, the bolt 12 moves upward in FIG. 1, and the abutting portion 721 of the biasing member 72 also moves upward in FIG. 1, whereby the degree of curvature of the biasing member 72 is reduced. Thus, the biasing force of the biasing member 72 is reduced.

Accordingly, the attachment portion 41 and the bolt 12 form an adjustment mechanism that adjusts the force pushing the vibrating element 6 against the slider 2.

Because this adjustment mechanism makes it possible to adjust the biasing force of the biasing member 72, namely, the force pushing the vibrating element 6 against the slider 2, it is possible to carry out fine adjustment of the biasing force of the biasing member 72 after the linear actuator 1 is assembled, for example, and in the case where there is a lowering of the performance and characteristics of the biasing force of the biasing member 72 caused by use or the like, it is possible to readjust the biasing force of the biasing member 72 to an appropriate value.

When the vibrating element 6 is vibrated, the slider 2 repeatedly receives the frictional force (pushing force) from the vibrating element 6, thereby moved (linearly moved) in the longitudinal direction thereof At this time, the slider 2 can be moved smoothly and reliably while the direction of movement is restricted (guided) by the rollers 51 and 52, and separation from the rollers 51 and 52 is prevented by the grooves 511 and 521.

Compared to a normal motor or the like, the vibrating element 6 is a miniature (thin-type) element.

In the present invention, by using the vibrating element 6 to move the slider 2, the entire linear actuator 1 can be miniaturized, and made thin in particular (i.e., the width of the right-and-left direction in FIG. 2 can be miniaturized).

In the linear actuator 1, by dividing the electrodes of the vibrating element 6 into plural sections, selectively applying a voltage to any of the plural sections to partially drive the piezoelectric elements, it is possible to freely select the in-plane vertical and/or bending vibration. Namely, the vibrating pattern (vibrating state) of the vibrating element 6 is changed by selecting a conducting pattern (conducting state) for each of the electrodes of the vibrating element 6, whereby the direction of the vibration (vibration displacement) of the protruding portion 66 of the vibrating element 6 is changed. Thus, the slider 2 can be moved in both directions to the left side and the right side (the forward direction and the backward direction) in FIG. 1. A description of a concrete example is given below.

As shown in FIG. 3, the vibrating element 6 is formed to have a substantially rectangular plate shape. The vibrating element 6 is constructed from four electrodes 61a, 61b, 61c and 61d; a plate-shaped piezoelectric element 62; a reinforcing plate (vibration plate) 63; a plate-shaped piezoelectric element 64; and four plate-shaped electrodes 65a, 65b, 65c and 65d (the electrodes 65a, 65b, 65c and 65d are not shown in FIG. 3, and only the reference numerals are shown in parentheses), which are laminated in that order from the upper side in FIG. 3. Further, the thickness of each of the above-mentioned elements is shown exaggerated in FIG. 3.

The piezoelectric elements 62, 64 are formed to have rectangular shapes, and by applying an AC voltage, they undergo expansion or contraction in the longitudinal direction (the direction of the long side) thereof There is no particular limit to the structural materials of the piezoelectric elements 62, 64, and it is possible to use various kinds of materials such as Lead Zirconate Titanate (PZT), Quartz Crystal, Lithium Niobate, Barium Titanate, Lead Titanate, Lead Metaniobate, Polyvinylidene Fluoride, Zinc Lead Niobate, Scandium Lead Niobate and the like.

The piezoelectric elements 62, 64 are respectively fixed to both surfaces of the reinforcing plate 63.

In the vibrating element 6, the piezoelectric element 62 is substantially equally divided (partitioned) into four rectangular areas, and the rectangular electrodes 61a, 61b, 61c and 61d are provided respectively in such divided areas. In the same way, the piezoelectric element 64 is substantially equally divided (partitioned) into four rectangular areas, and the rectangular electrodes 65a, 65b, 65c and 65d are provided respectively in such divided areas. In this case, the electrodes 65a, 65b, 65c and 65d are arranged respectively underneath the electrodes 61a, 61b, 61c and 61d.

The electrodes 61a and 61c on one diagonal line and the electrodes 65a and 65c positioned underneath these are all electrically connected. In the same way, the electrodes 61b and 61d on the other diagonal line and the electrodes 65b and 65d positioned underneath these are all electrically connected (hereafter, to "electrically connected" is referred to simply as "connected").

The reinforcing plate 63 has a function of reinforcing the entire vibrating element 6, and prevents damage due to over-vibration of the vibrating element 6, external force and the like. There is no particular limit to the structural materials of the reinforcing plate 63, but various metal materials are preferred such as stainless steel, Aluminum or Aluminum alloy, Titan or Titan alloy, and Copper or Copper system alloy or the like, for example.

The reinforcing plate 63 preferably has a thinner (smaller) thickness than the piezoelectric elements 62, 64. Thus, it is possible to vibrate the vibrating element 6 with high efficiency.

The reinforcing plate 63 has a function of serving as a common electrode for the piezoelectric elements 62, 64. Namely, an AC voltage is applied to the piezoelectric element 62 by the reinforcing plate 63 and desired electrodes selected from the electrodes 61a, 61b, 61c and 61d, and an AC voltage is applied to the piezoelectric element 64 by the reinforcing plate 63 and desired electrodes selected from the electrodes 65a, 65b, 65c and 65d.

When an AC voltage is applied over the substantially entire piezoelectric elements 62, 64, the piezoelectric elements 62, 64 repeatedly undergo expansion and contraction in the longitudinal direction. Accompanying with this motion, the reinforcing plate 63 also repeatedly undergoes expansion and contraction in the longitudinal direction. Namely, when an AC voltage is applied over the substantially entire piezoelectric elements 62, 64, the vibrating element 6 vibrates (undergoes vibration in a vertical direction) with minute amplitude in the longitudinal direction (the direction of the long side), whereby the protruding portion 66 undergoes vertical vibration (reciprocating motion).

The protruding portion 66 is integrally formed on the right end portion of the reinforcing plate 63 in FIG. 3.

The protruding portion 66 is provided at the short side 601 in the lower side in FIG. 1 in the middle of the width direction (the right-and-left direction in FIG. 1) of the reinforcing plate 63.

Further, the arm portion 68 having elasticity (flexibility) is integrally formed on the lower end portion of the reinforcing plate 63 in FIG. 3.

The arm portion 68 is provided at the short side 602 in the left side in FIG. 1 in the substantially middle of the longitudinal direction (the upper-and-lower direction in FIG. 1) of the reinforcing plate 63 so as to protrude in a direction substantially perpendicular to the longitudinal direction. As described above, the fixing portion 722 and the like are integrally formed on the tip portion (the left side end portion in FIG. 1) of the arm portion 68.

In the state where the protruding portion 66 is in contact with the slider 2, when electricity is conducted to the electrodes 61a, 61c, 65a and 65c positioned on a diagonal line of the vibrating element 6 by applying an AC voltage between the reinforcing plate 63 and each of these electrodes 61a, 61c, 65a and 65c, as shown in FIG. 4, portions corresponding to the electrodes 61a, 61c, 65a and 65c of the vibrating element 6 repeatedly undergo expansion and contraction in the direction of the arrows a. Therefore, the protruding portion 66 of the vibrating element 6 is displaced, namely, undergoes vibration (reciprocates) in a slanting direction shown by an arrow b, or is displaced, namely, undergoes elliptical vibration (elliptical movement) along a substantially elliptic shape shown by an arrow c. The slider 2 receives the frictional force (pushing force) from the protruding portion 66 when the portions corresponding to the electrodes 61a, 61c, 65a and 65c of the vibrating element 6 undergo expansion, and this repeating frictional force (pushing force) moves the slider 2 to the left side (i.e., in the reverse direction) in FIG. 4.

At this time, the electrodes 61b, 61d, 65b and 65d positioned on the other diagonal line of the vibrating element 6 which are not conducting electricity are used as vibration detecting means for detecting the vibration of the vibrating element 6.

Figure 5:
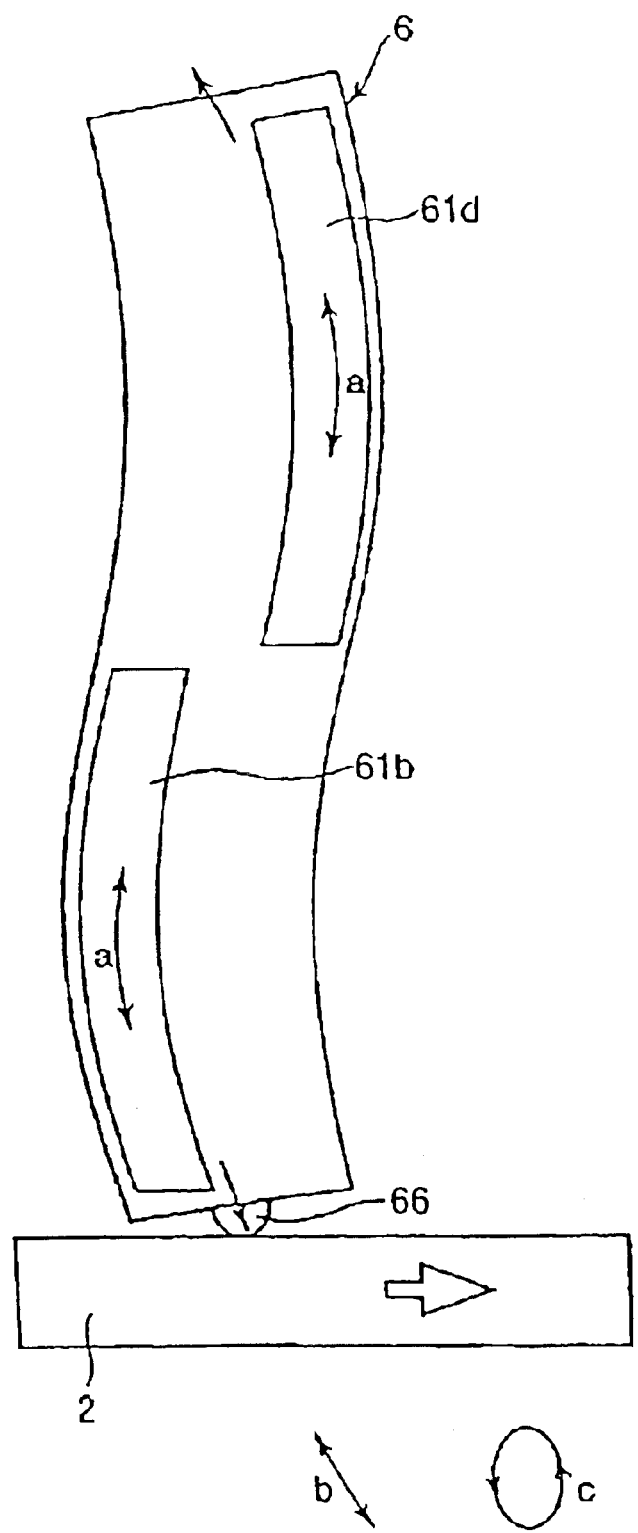
FIG. 5 is a plan view showing the vibration state of the vibrating element in the linear actuator shown in FIG. 1.

In the reverse situation of that described above, when electricity is conducted to the electrodes 61b, 61d, 65b and 65d positioned on the other diagonal line of the vibrating element 6 by applying an AC voltage between the reinforcing plate 63 and each of these electrodes 61b, 61d, 65b and 65d, as shown in FIG. 5, portions corresponding to the electrodes 61b, 61d, 65b and 65d of the vibrating element 6 repeatedly undergo expansion and contraction in the direction of the arrows a. Therefore, the protruding portion 66 of the vibrating element 6 is displaced, namely, undergoes vibration (reciprocates) in a slanting direction shown by an arrow b, or is displaced, namely, undergoes elliptical vibration (elliptical movement) along a substantially elliptic shape shown by an arrow c. The slider 2 receives the frictional force (pushing force) from the protruding portion 66 when the portions corresponding to the electrodes 61b, 61d, 65b and 65d of the vibrating element 6 undergo expansion, and this repeating frictional force (pushing force) moves the slider 2 to the right side (i.e., in the forward direction) in FIG. 5.

At this time, the electrodes 61a, 61c, 65a and 65c positioned on a diagonal line of the vibrating element 6 which are not conducting electricity are used as vibration detecting means for detecting the vibration of the vibrating element 6.

Here, in both FIG. 4 and FIG. 5, the deformation of the vibrating element 6 is shown exaggerated, and the arm portion 68 is not shown.

In this regard, by appropriately selecting the shape and size of the vibrating element 6 and the position of the protruding portion 66 and the like so that a resonance frequency of the bending vibration (the vibration in the horizontal direction in FIG. 4 and FIG. 5) is substantially as same level as the frequency of the vertical vibration, the vertical vibration and the bending vibration of the vibrating element 6 can be carried out simultaneously, and this makes it possible to displace (i.e., carry out elliptical vibration of) the protruding portion 66 along a substantially elliptic shape as shown by the arrow c in FIG. 4 and FIG. 5. Further, as is known conventionally, by driving the vertical vibration and bending vibration with separate phase shifts, it is possible to change a ratio of a major axis and a minor axis (major axis/minor axis) of the elliptical vibration.

Further, because the slider 2 is directly driven (moved) by the vibrating element 6, this has the particular advantage of making the structure lighter and compact (thinner). Moreover, the structure can be made very simple, and this makes it possible to reduce the manufacturing cost.

Further, because the in-plane vibration of the vibrating element 6 is directly converted to the linear motion (movement) of the slider 2, the energy loss accompanying this conversion is small, and this makes it possible to drive the slider 2 with high efficiency.

Further, because the vibrating element 6 drives the slider 2 by the frictional force (pushing force) described above which is different than the case where driving is carried out by magnetic force like that in an ordinary motor, the driving force is high. For this reason, it is possible to drive the slider 2 with sufficient force without using any variable speed mechanism (decelerating mechanism).

The frequency of the AC voltage applied to the piezoelectric elements 62, 64 has no particular limit, but it is preferably the substantially same level as the resonance frequency of the vibration (vertical vibration) of the vibrating element 6. Thus, the amplitude of the vibrating element 6 becomes large, and this makes it possible to drive the slider 2 with high efficiency.

Preferably, in this structure, there is substantially no match between the resonance frequency of the bending vibration of the slider 2 and the m'th multiple (where m is all of the natural numbers) of the frequency of the vibration of the vibrating element 6, and substantially no match between the n'th multiple (where n is all of the natural numbers) of the resonance frequency of the bending vibration of the slider 2 and the frequency of the vibration of the vibrating element 6.

Thus, it is possible to more reliably prevent bending resonance of the slider 2, and this makes it possible to move the slider 2 smoothly in a stable manner.

Next, the conducting circuit 20 will be described.

As shown in FIG. 6, the conducting circuit 20 includes a drive circuit 8 equipped with an oscillating circuit 81, an amplification circuit 82 and a moving amount control circuit 83, and a switch 9.

The switch 9 is a switching means for switching between conducting electrodes and electrodes used as vibration detecting means, and by switching the switch 9, the direction of movement of the slider 2 is switched.

The switch 9 includes two linked switching sections 91 and 92. The electrode 61d of the vibrating element 6 is connected to a terminal 97 of the switching section 91, and the electrode 61a is connected to a terminal 98 of the switching section 92.

Further, a terminal 93 of the switching section 91 and a terminal 96 of the switching section 92 are both connected to the output side of the amplification circuit 82 of the drive circuit 8, and an AC voltage is applied to each of the terminals 93 and 96 from the amplification circuit 82.

Further, the reinforcing plate 63 of the vibrating element 6 is connected to ground.

Further, a terminal 94 of the switching section 91 and a terminal 95 of the switching section 92 are both connected to the input side of the oscillating circuit 81 of the drive circuit 8.

Next, the operation of the linear actuator 1 will be described with reference to FIG. 6.

In the state where the power switch is ON, when instructions for the direction of movement and the amount of movement of the slider 2 are given, the switch 9 and the moving amount control circuit 83 of the drive circuit 8 are operated based on the given instructions.

In the case where the instructions indicate that the slider 2 is to be moved upward (in the forward direction) in FIG. 6, as shown in FIG. 6, the switch 9 is switched so that the terminal 93 and the terminal 97 of the switch 9 are connected, and the terminal 95 and the terminal 98 are connected. In this way, the output side of the amplification circuit 82 of the drive circuit 8 is conducted to the electrodes 61b, 61d, 65b and 65d of the vibrating element 6, and the electrodes 61a, 61c, 65a and 65c of the vibrating element 6 is conducted to the input side of the oscillating circuit 81 of the drive circuit 8.

The oscillating circuit 81 and the amplification circuit 82 of the drive circuit 8 are both controlled by the moving amount control circuit 83.

An AC voltage outputted from the oscillating circuit 81 is amplified by the amplification circuit 82 and then applied between the reinforcing plate 63 and each of the electrodes 61b, 61d, 65b and 65d. Thus, as described above, the portions corresponding to the electrodes 61b, 61d, 65b and 65d of the vibrating element 6 repeatedly undergo expansion and contraction, and the protruding portion 66 of the vibrating element 6 undergoes vibration (reciprocates) in the slanting direction shown by the arrow b in FIG. 5, and undergoes elliptical vibration (elliptical movement) as shown by the arrow c, whereby the slider 2 receives the frictional force (pushing force) from the protruding portion 66 when the portions corresponding to the electrodes 61b, 61d, 65b and 65d of the vibrating element 6 undergo expansion, and this repeating frictional force (pushing force) moves the slider 2 upward (in the forward direction) in FIG. 6.

At this time, the slider 2 can be moved smoothly and reliably while the direction of movement is restricted (guided) by the rollers 51 and 52, and separation from the rollers 51 and 52 is prevented by the grooves 511 and 521.

On the other hand, the electrodes 61a, 61c, 65a and 65c which are not conducting electricity form detecting electrodes which are used to detect voltage (induced voltage) induced between the reinforcing plate 63 and each of the electrodes 61a, 61c, 65a and 65c.

The detected induced voltage (detected voltage) is inputted to the oscillating circuit 81, and then based on such detected voltage, the oscillating circuit 81 outputs an AC voltage having a frequency (resonance frequency) at which the amplitude of the vibrating element 6 becomes maximum, namely, the detected voltage becomes maximum. In this way, the slider 2 can be moved with good efficiency.

Further, the moving amount control circuit 83 controls the conduction of electricity to each electrode based on the indicated amount of movement (target value) of the slider 2.

Namely, the moving amount control circuit 83 operates the oscillating circuit 81 and the amplification circuit 82, and drives the vibrating element 6 to move the slider 2 until the amount of movement of the slider 2 reaches the indicated amount of movement (target value) of the slider 2.

At this time, if the slider 2 is moved too far to the right side in FIG. 1, the protruding portion 21 comes into contact with the roller 51, whereby the movement of the slider 2 is restricted, and the separation of the slider 2 from the roller 51 is prevented.

In the reverse situation of that described above, in the case where the instructions indicate that the slider 2 is to be moved downward (in the reverse direction) in FIG. 6, the switch 9 is switched so that the terminal 94 and the terminal 97 of the switch 9 are connected, and the terminal 96 and the terminal 98 are connected. In this way, the output side of the amplification circuit 82 of the drive circuit 8 is conducted to the electrodes 61a, 61c, 65a and 65c of the vibrating element 6, and the electrodes 61b, 61d, 65b and 65d of the vibrating element 6 is conducted to the input side of the oscillating circuit 81 of the drive circuit 8. Because the other operations are the same as those of the case where the instructions indicate that the slider 2 is to be moved upward in FIG. 6, a description thereof is omitted. However, in the same manner as described above, if the slider 2 is moved too far to the left side in FIG. 1, the protruding portion 22 comes into contact with the roller 52, whereby the movement of the slider 2 is restricted, and the separation of the slider 2 from the roller 52 is prevented.

According to the linear actuator 1 of the first embodiment, in addition to the advantage of making it possible to construct a compact (thin) linear actuator 1, there is the advantage of the complete elimination of electromagnetic noise such as that from an ordinary motor because an ordinary motor is not used to move the slider 2, or even when there is electromagnetic noise, such noise is small. Therefore, there is no effect on the surrounding devices.

Further, because the slider 2 is supported by the rollers 51 and 52, it is possible to reduce the frictional resistance, and this makes it possible to linearly move the slider 2 smoothly and reliably.

Further, when the slider 2 is not being driven (suspended state), namely, when electricity is not conducted to any of the electrodes, the protruding portion 66 is in pushing contact with the slider 2, and the frictional force between the protruding portion 66 and the slider 2 makes it possible to keep the slider 2 in the suspended state. Namely, the slider 2 is prevented from moving, and this makes it possible to hold the slider 2 at a given position.

Further, because the slider 2 can be moved in the forward and reverse directions (both the left and right directions), there is wide applicability.

Further, because it is possible to move the slider 2 in both directions by one vibrating element 6, compared with the case where an exclusive vibrating element is provided for each direction of movement, it is possible to reduce the number of components, and this has the advantage of making the manufacturing simple, and making the entire linear actuator 1 compact and light.

Further, as shown in FIG. 2, at the assembly time, it is possible to carry out assembly by assembling components on the base 4 from one face in FIG. 2 (the left side in FIG. 2) without components assembled from the right side, whereby this has the advantage of making it possible to carry out assembly easily and quickly.

Here, in the present embodiment, the slider 2 is movably supported by the two rollers 51 and 52, but in the present invention, it is possible to provide three or more rollers to movably support the slider 2.

Next, a second embodiment of a linear actuator of the present invention will be described.

Figure 7:
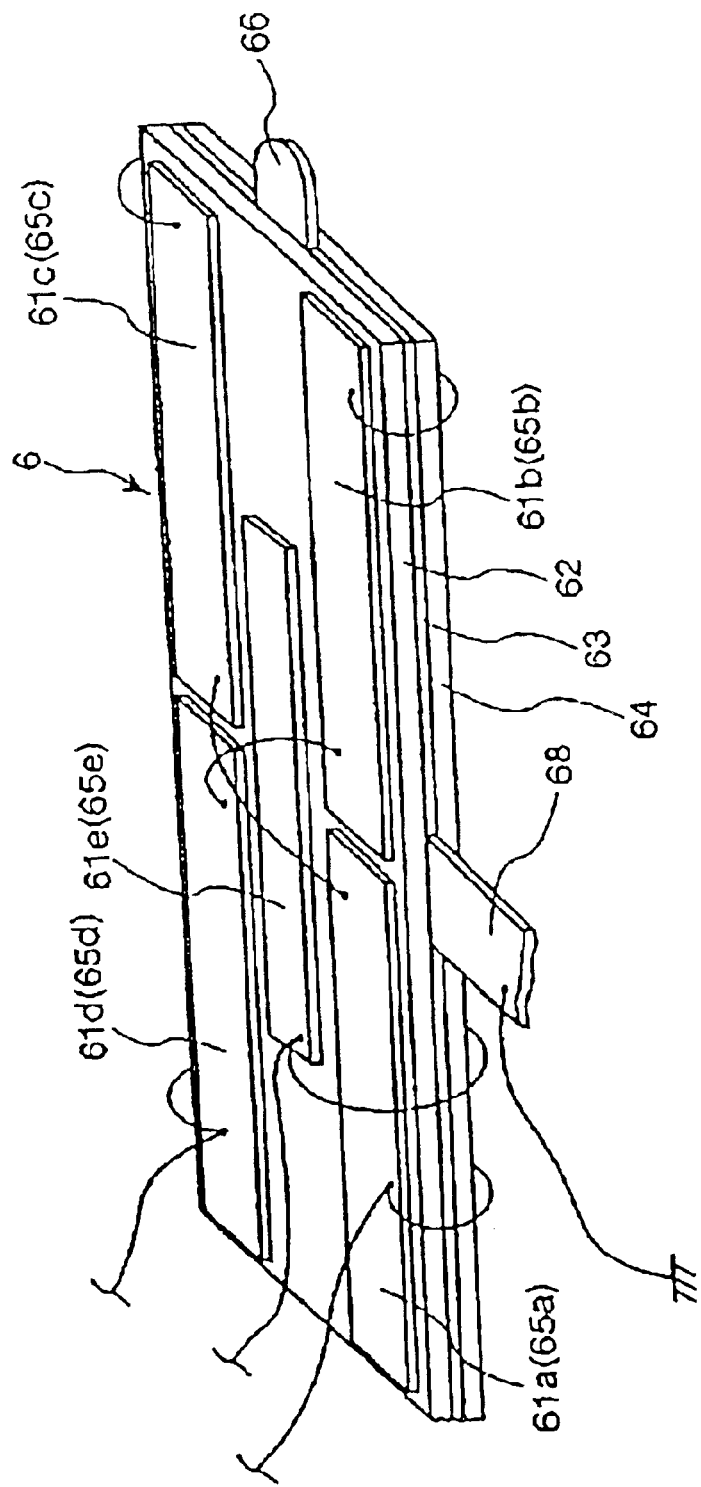
FIG. 7 is a perspective view of a vibrating element in the second embodiment of a linear actuator according to the present invention.
Figure 8:
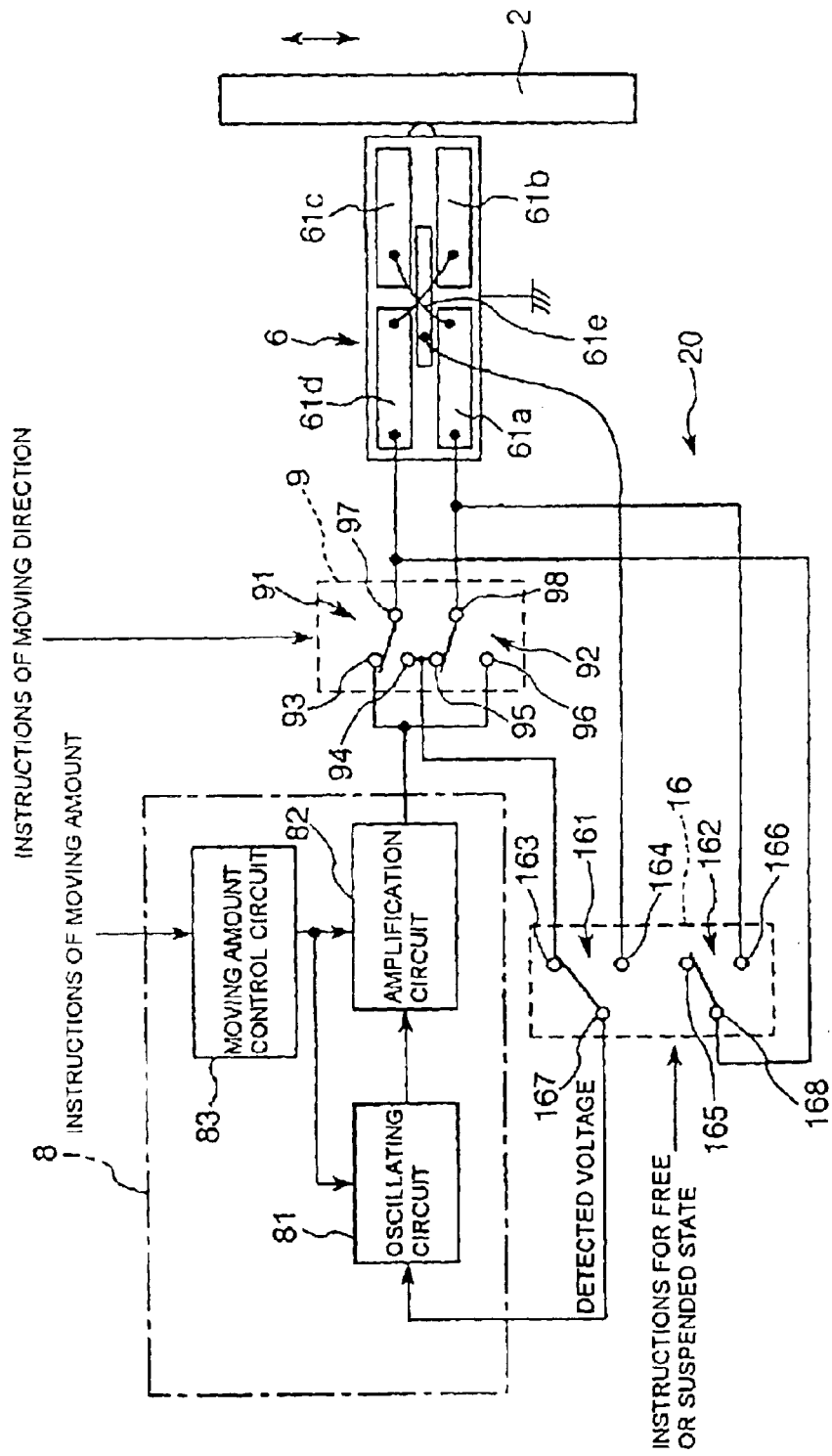
FIG. 8 is a block diagram showing a circuit configuration in the second embodiment of a linear actuator according to the present invention.

FIG. 7 is a perspective view of a vibrating element in the second embodiment of a linear actuator according to the present invention, and FIG. 8 is a block diagram showing a circuit configuration in the second embodiment of a linear actuator according to the present invention.

In the linear actuator 1 of the second embodiment described below, the description focuses on the points of difference with the first embodiment described above, and a description of the same items is omitted.

The linear actuator 1 of the second embodiment has a first mode in which the slider 2 is maintained (kept) in a suspended state; a second mode in which the slider 2 is allowed to be moved (i.e., the slider 2 lies in a free state); a third mode in which the slider 2 is moved in the forward direction; and a fourth mode in which the slider 2 is moved in the reverse direction. The linear actuator 1 is constructed so as to make it possible to select any of the first mode, the second mode, the third mode and the fourth mode by selecting any of conducting pattern to each of electrodes to change a vibrating pattern of the vibrating element 6. This structure is described concretely below.

As shown in FIG. 7, in the vibrating element 6, five plate-shaped electrodes 61a, 61b, 61c, 61d and 61e are provided on the upper side of the piezoelectric element 62 in FIG. 7, and five plate-shaped electrodes 65a, 65b, 65c, 65d and 65e (the electrodes 65a, 65b, 65c, 65d and 65e are not shown in FIG. 7, but only the reference numerals are shown in parentheses) are provided on the lower side of the piezoelectric element 64 in FIG. 7.

Namely, the piezoelectric element 62 is divided (partitioned) into four rectangular areas, and the rectangular electrodes 61a, 61b, 61c and 61d are provided respectively in such divided areas. In the same way, the piezoelectric element 64 is divided (partitioned) into four rectangular areas, and the rectangular electrodes 65a, 65b, 65c and 65d are provided respectively in such divided areas.

Further, the rectangular electrode 61e is provided on the middle portion of the piezoelectric element 62, and in the same way, the rectangular electrode 65e is provided on the middle portion of the piezoelectric element 64. Each of the electrodes 61e and 65e is arranged so that its longitudinal direction (the direction of the long side) substantially matches the longitudinal direction (the direction of the long side) of the vibrating element 6. The electrodes 61e and 65e are detecting electrodes used to detect the voltage (induced voltage) induced between the reinforcing plate 63 and each of the electrodes 61e and 65e, namely, the voltage (induced voltage) induced by the longitudinal component (vertical vibration component) of the vibration of the vibrating element 6. Further, the electrodes 61e and 65e are used in the second mode.

In this regard, the electrodes 65a, 65b, 65c, 65d and 65e are arranged respectively underneath the electrodes 61a, 61b, 61c, 61d and 61e.

The electrodes 61a and 61c on one diagonal line and the electrodes 65a and 65c positioned underneath these are all electrically connected, and in the same way, the electrodes 61b and 61d on the other diagonal line and the electrodes 65b and 65d positioned underneath these are all electrically connected. Further, in the same way, the middle portion electrode 61e and the electrode 65e positioned underneath this are electrically connected (hereafter referred to simply as "connected").

As shown in FIG. 8, the conducting circuit 20 of the linear actuator 1 of the second embodiment includes a drive circuit 8 equipped with an oscillating circuit 81, an amplification circuit 82 and a moving amount control circuit 83; a switch 9; and a switch 16.

The switch 9 is a switching means for switching between conducting electrodes and electrodes used as vibration detecting means, and by switching the switch 9, the direction of movement of the slider 2 is switched.

The switch 9 includes two linked switching sections 91 and 92. The electrode 61d of the vibrating element 6 is connected to a terminal 97 of the switching section 91, and the electrode 61a is connected to a terminal 98 of the switching section 92.

Further, a terminal 93 of the switching section 91 and a terminal 96 of the switching section 92 are both connected to the output side of the amplification circuit 82 of the drive circuit 8, and an AC voltage is applied to each of the terminals 93 and 96 from the amplification circuit 82.

Further, the reinforcing plate 63 of the vibrating element 6 is connected to ground.

Further, a terminal 94 of the switching section 91 and a terminal 95 of the switching section 92 are both connected to the input side of the oscillating circuit 81 of the drive circuit 8.

The switch 16 includes two linked switching sections 161 and 162.

A terminal 163 of the switching section 161 is connected to the terminals 94 and 95 of the switch 9, and a terminal 164 is connected to the electrode 61e of the vibrating element 6.

Further, a terminal 167 of the switching section 161 is connected to the input side of the oscillating circuit 81 of the drive circuit 8.

Further, a terminal 166 of the switching section 162 is connected to the terminal 98 of the switch 9 and the electrode 61a of the vibrating element 6, and a terminal 168 is connected to the terminal 97 of the switch 9 and the electrode 61d of the vibrating element 6.

In this regard, because the drive circuit 8 is the same as that of the first embodiment described above, a description thereof is omitted.

Next, each of the above-mentioned modes will be described.

In the first mode, there is no excitation of the vibrating element 6. Namely, electricity is not conducted to any of the electrodes of the vibrating element 6. In this case, because the protruding portion 66 of the vibrating element 6 is in pushing contact with the slider 2, the frictional force between the protruding portion 66 and the slider 2 makes it possible to keep the slider 2 in a suspended state. Namely, the slider 2 is prevented from moving, and this makes it possible to hold the slider 2 at a given position.

Further, in the second mode, a vibration is excited in a direction substantially perpendicular to the direction of movement of the slider 2. Namely, electricity is conducted to the electrodes 61a, 61b, 61c, 61d, 65a, 65b, 65c and 65d on both diagonal lines of the vibrating element 6, and an AC voltage is applied between the reinforcing plate 63 and each of the electrodes 61a, 61b, 61c, 61d, 65a, 65b, 65c and 65d. In this way, the vibrating element 6 repeatedly undergoes expansion and contraction in the longitudinal direction (the direction of the long side), namely, vibrates (undergoes vertical vibration) with minute amplitude in the longitudinal direction. In other words, the protruding portion 66 of the vibrating element 6 undergoes vibration (reciprocates) in the longitudinal direction (the direction of the long side).

When the vibrating element 6 undergoes contraction, the slider 2 is away from the protruding portion 66, and this eliminates the frictional force between the slider 2 and the protruding portion 66 or reduces such frictional force, whereby the slider 2 is in a free state so as to be able to be freely moved in either direction toward the upper side or the lower side in FIG. 8. On the other hand, when the vibrating element 6 undergoes expansion, the slider 2 receives the pushing force from the protruding portion 66. However, because the direction thereof is a direction perpendicular to the longitudinal direction of the slider 2, the slider 2 does not move in either direction toward the upper side or the lower side in FIG. 8.

Accordingly, a free state is formed by the vibration of the vibrating element 6, and this makes it possible to freely move the slider 2 in either direction toward the upper side or the lower side in FIG. 8.

Further, in the third mode, a vibration which includes an vibration displacement component in at least the forward direction of movement of the slider 2 is excited. Namely, electricity is conducted to the electrodes 61b, 61d, 65b, and 65d positioned on one diagonal line of the vibrating element 6, and an AC voltage is applied between the reinforcing plate 63 and each of the electrodes 61b, 61d, 65b and 65d. In this way, as described in the first embodiment, the slider 2 moves upward (in the forward direction) in FIG. 8. At this time, the electrodes 61a, 61c, 65a and 65c positioned on the other diagonal line of the vibrating element 6 which are not conducting electricity are used as vibration detecting means for detecting the vibration of the vibrating element 6.

Further, in the fourth mode, a vibration which includes a vibration displacement component in at least the reverse direction of movement of the slider 2 is excited. Namely, electricity is conducted to the electrodes 61a, 61c, 65a, and 65c positioned on one diagonal line of the vibrating element 6, and an AC voltage is applied between the reinforcing plate 63 and each of the electrodes 61a, 61c, 65a and 65c. In this way, as described in the first embodiment, the slider 2 moves downward (in the reverse direction) in FIG. 8. At this time, the electrodes 61b, 61d, 65b and 65d positioned on the other diagonal line of the vibrating element 6 which are not conducting electricity are used as vibration detecting means for detecting the vibration of the vibrating element 6.

Next, the operation of the linear actuator 1 will be described with reference to FIG. 8.

In the state where the power switch is ON, when instructions for suspending/freeing the slider 2 and instructions for the direction of movement and the amount of movement of the slider 2 are given, the switch 9, the switch 16 and the moving amount control circuit 83 of the drive circuit 8 are operated based on such instructions. Namely, any one of the first mode, second mode, third mode and fourth mode described above is established based on the instructions.

In the case (of the third mode) where the instructions indicate that the slider 2 is to be moved upward (in the forward direction) in FIG. 8, as shown in FIG. 8, the switch 16 is switched so that the terminal 163 and the terminal 167 of the switch 16 are connected, and the terminal 165 and the terminal 168 are connected, and the switch 9 is switched so that the terminal 93 and the terminal 97 of the switch 9 are connected, and the terminal 95 and the terminal 98 are connected. In this way, the output side of the amplification circuit 82 of the drive circuit 8 is conducted to the electrodes 61b, 61d, 65b and 65d of the vibrating element 6, and the electrodes 61a, 61c, 65a and 65c of the vibrating element 6 are conducted to the input side of the oscillating circuit 81 of the drive circuit 8.

The oscillating circuit 81 and the amplification circuit 82 of the drive circuit 8 are both controlled by the moving amount control circuit 83.

An AC voltage outputted from the oscillating circuit 81 is amplified by the amplification circuit 82 and then applied between the reinforcing plate 63 and each of the electrodes 61b, 61d, 65b and 65d. Thus, as described above, the portions corresponding to the electrodes 61b, 61d, 65b and 65d of the vibrating element 6 repeatedly undergo expansion and contraction, and the protruding portion 66 of the vibrating element 6 undergoes vibration (reciprocates) in a slanting direction shown by the arrow b in FIG. 5, and undergoes elliptical vibration (elliptical movement) as shown by the arrow c, whereby the slider 2 receives the frictional force (pushing force) from the protruding portion 66 when the portions corresponding to the electrodes 61b, 61d, 65b and 65d of the vibrating element 6 undergo expansion, and this repeating frictional force (pushing force) moves the slider 2 upward (in the forward direction) in FIG. 8.

At this time, the electrodes 61a, 61c, 65a and 65c which are not conducting electricity form detecting electrodes which are used to detect voltage (induced voltage) induced between the reinforcing plate 63 and each of the electrodes 61a, 61c, 65a and 65c.

The detected induced voltage (detected voltage) is inputted to the oscillating circuit 81, and then based on such detected voltage, the oscillating circuit 81 outputs an AC voltage having a frequency (resonance frequency) at which the amplitude of the vibrating element 6 becomes maximum, namely, the detected voltage becomes maximum. In this way, the slider 2 can be moved with good efficiency.

Further, the moving amount control circuit 83 controls the conduction of electricity to each electrode based on the indicated amount of movement (target value) of the slider 2.

Namely, the moving amount control circuit 83 operates the oscillating circuit 81 and the amplification circuit 82, and drives the vibrating element 6 to move the slider 2 until the amount of movement of the slider 2 reaches the indicated amount of movement (target value) of the slider 2.

In the reverse situation of that described above, in the case (of the fourth mode) where the instructions indicate that the slider 2 is to be moved downward (in the reverse direction) in FIG. 8, the switch 16 is switched so that the terminal 163 and the terminal 167 of the switch 16 are connected, and the terminal 165 and the terminal 168 are connected, and the switch 9 is switched so that the terminal 94 and the terminal 97 of the switch 9 are connected, and the terminal 96 and the terminal 98 are connected. In this way, the output side of the amplification circuit 82 of the drive circuit 8 is conducted to the electrodes 61a, 61c, 65a and 65c of the vibrating element 6, and the electrodes 61b, 61d, 65b and 65d of the vibrating element 6 are conducted to the input side of the oscillating circuit 81 of the drive circuit 8. Because the other operations are the same as those of the case where the instructions indicate that the slider 2 is to be moved upward in FIG. 8, a description thereof is omitted.

Further, in the case (of the first mode) where the instructions indicate that the slider 2 is to be kept in the suspended state, as shown in FIG. 8, the switch 16 is switched so that the terminal 163 and the terminal 167 of the switch 16 are connected, and the terminal 165 and the terminal 168 are connected.

Then, the moving amount control circuit 83 does not operate the oscillating circuit 81 and the amplification circuit 82. Namely, an AC voltage is not applied to any of the electrodes of the vibrating element 6.

The protruding portion 66 is in pushing contact with (abuts on) the slider 2, and the frictional force between the protruding portion 66 and the slider 2 keeps the slider 2 in the suspended state. Namely, the slider 2 is prevented from moving, and the slider 2 is held at a given position.

Here, in the case of the first mode, the switches 9 and 16 may be switched in any manner so long as an AC voltage is not applied to any of the electrodes of the vibrating element 6.

Further, in the case (of the second mode) where the instructions indicate that the slider 2 is to be set in the free state, the switch 16 is switched so that the terminal 164 and the terminal 167 of the switch 16 are connected, and the terminal 166 and the terminal 168 are connected. In this way, the output side of the amplification circuit 82 of the drive circuit 8 is conducted to the electrodes 61a, 61b, 61c, 61d, 65a, 65b, 65c and 65d of the vibrating element 6, and the electrodes 61e and 65e of the vibrating element 6 are conducted to the input side of the oscillating circuit 81 of the drive circuit 8.

An AC voltage outputted from the oscillating circuit 81 is amplified by the amplification circuit 82 and then applied between the reinforcing plate 63 and each of the electrodes 61a, 61b, 61c, 61d, 65a, 65b, 65c and 65d. In this way, as described above, the protruding portion 66 of the vibrating element 6 undergoes vibration (reciprocates) in the longitudinal direction, whereby the slider 2 is in a free state so as to be able to be freely moved in either direction toward the upper side or the lower side in FIG. 8.

At this time, the voltage (induced voltage) induced between the reinforcing plate 63 and each of the electrodes 61e and 65e is detected from each of the electrodes 61e and 65e. The detected induced voltage (detected voltage) is inputted to the oscillating circuit 81, and then based on such detected voltage, the oscillating circuit 81 outputs an AC voltage having a frequency at which the amplitude of the vertical vibration of the vibrating element 6 becomes maximum, namely, the detected voltage becomes maximum. In this way, the slider 2 can be moved more smoothly.

In this regard, in the case of the second mode, the switch 9 may be switched in any manner.

The linear actuator 1 of this second embodiment obtains the same results as the first embodiment described above.

Further, in this linear actuator 1, because it is possible to select any state from the four states, which are a state where the slider 2 is kept in a suspended state, namely, a state of high friction, a state where the slider 2 is allowed to be moved (i.e., the slider 2 is set in a free state), namely, a state of low friction, a state where the slider 2 is moved in the forward direction, and a state where the slider 2 is moved in the reverse direction, there is wide applicability.

Here, in the vibrating element 6 described above, a description has been given for the case where the electrodes for carrying out driving the actuator 1 are divided into four sections. However, this is just one example for selectively exciting vertical vibration and bending vibration, and in the present invention, the structure of the vibrating element 6 and the driving method are not limited to those described above.

Next, a third embodiment of a linear actuator of the present invention will be described.

Figure 9:
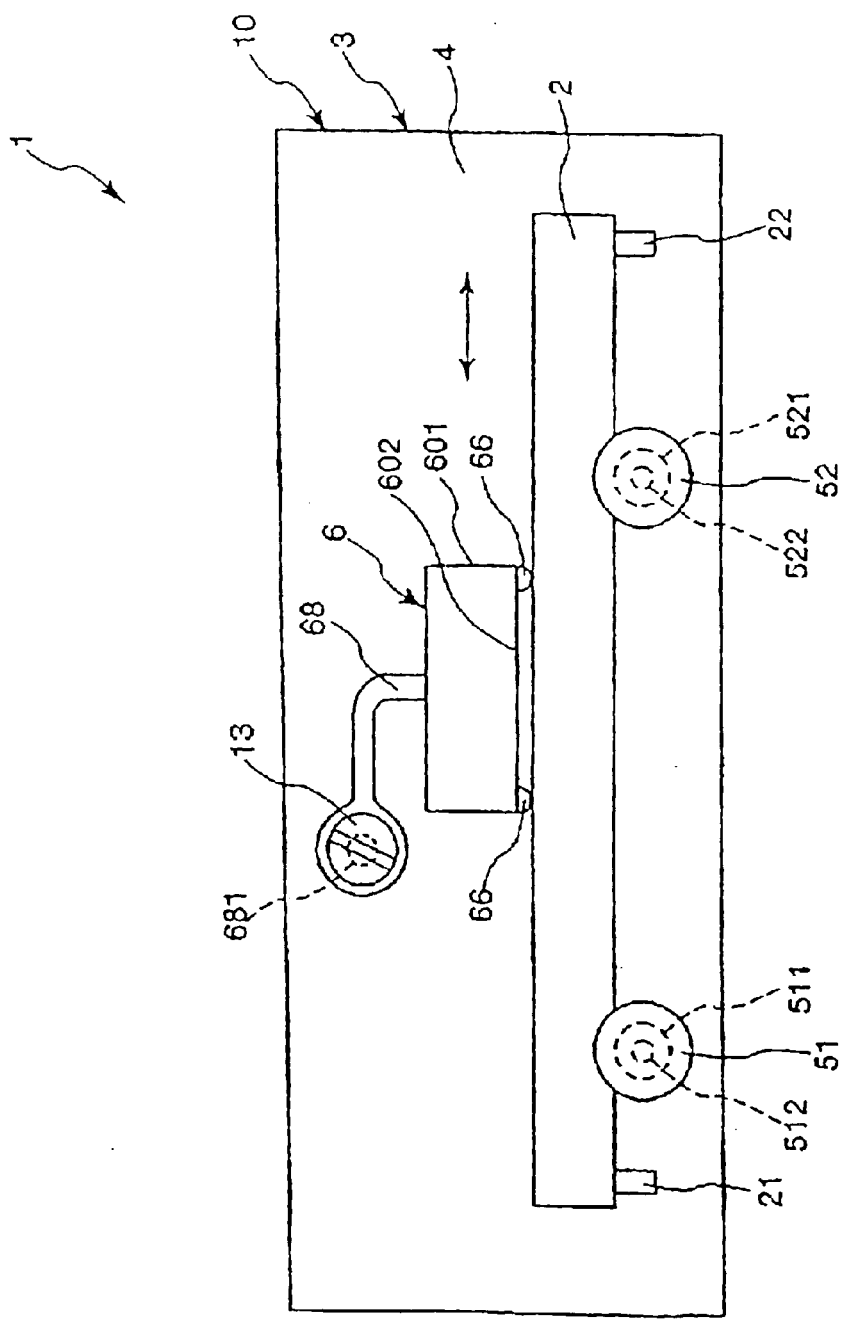
FIG. 9 is a plan view showing a third embodiment of the linear actuator according to the present invention.

FIG. 9 is a plan view showing a third embodiment of the linear actuator according to the present invention. In following explanations using FIG. 9, the upper side in FIG. 9 is referred to as "upper", the lower side is referred to as "lower", the right side is referred to as "right", and the left side is referred to as "left".

In the linear actuator 1 of the third embodiment described below, the description focuses on the points of difference with the first embodiment described above, and a description of the same items is omitted.

As shown in FIG. 9, in the linear actuator 1 of the third embodiment, the vibrating element 6 is provided so that the long side 602 of the vibrating element 6 is substantially parallel with the direction of movement (the longitudinal direction) of the slider 2, namely, the short side 601 of the vibrating element 6 is substantially perpendicular to the direction of movement of the slider 2.

Thus, it is possible to make the linear actuator 1 more compact (smaller in the upper-and-lower direction).

Further, protruding portions (portions abutting on the slider 2) 66 of the vibrating element 6 are provided at a plurality of locations (two locations in the structure in the drawing) of the reinforcing plate 63. One protruding portion 66 is provided on the right side end portion of the long side 602 at the lower side of the reinforcing plate 63, and the other protruding portion 66 is provided on the left side end portion of the long side 602 at the lower side of the reinforcing plate 63.

Thus, it is possible to move the slider 2 by applying frictional force (pushing force) to the slider 2 alternatively by the two spaced protruding portions 66 of the vibrating element 6, and compared with the case where the slider 2 is moved by one protruding portion 66, it is possible to move the slider 2 with strong force.

Further, the arm portion 68 is curved (bent) partway, and a hole 681 through which the bolt 13 is inserted is formed in the tip portion (left side end portion) of the arm portion 68.

The vibrating element 6 is fixed by the bolt 13 to a screw hole (not shown) formed in the base 4 near the hole 681 of the arm portion 68. Namely, the vibrating element 6 is supported by the arm portion 68. Thus, the vibrating element 6 can freely vibrate, and vibration is carried out at relatively great amplitude.

Further, the vibrating element 6 is biased downward by the arm portion 68, and by means of this biasing force, the protruding portions 66 of the vibrating element 6 make pushing contact with (are pushed against) the contact portion (the upper side surface) of the slider 2.

Accordingly, the arm portion 68 forms pushing means for pushing the vibrating element 6 against the slider 2.

The linear actuator 1 of this third embodiment obtains the same results as the first embodiment described above.

In this case, the linear actuator 1 in this third embodiment may be provided with the pushing means 7 like that in the first embodiment described above.

Further, a first mode in which the slider 2 is kept in a suspended state, a second mode in which the slider 2 is allowed to be moved (i.e., the slider 2 lies in a free state), a third mode in which the slider 2 is moved in the forward direction, and a fourth mode in which the slider 2 is moved in the reverse direction may be provided like those in the second embodiment described above.

Next, a fourth embodiment of a linear actuator of the present invention will be described.

Figure 10:
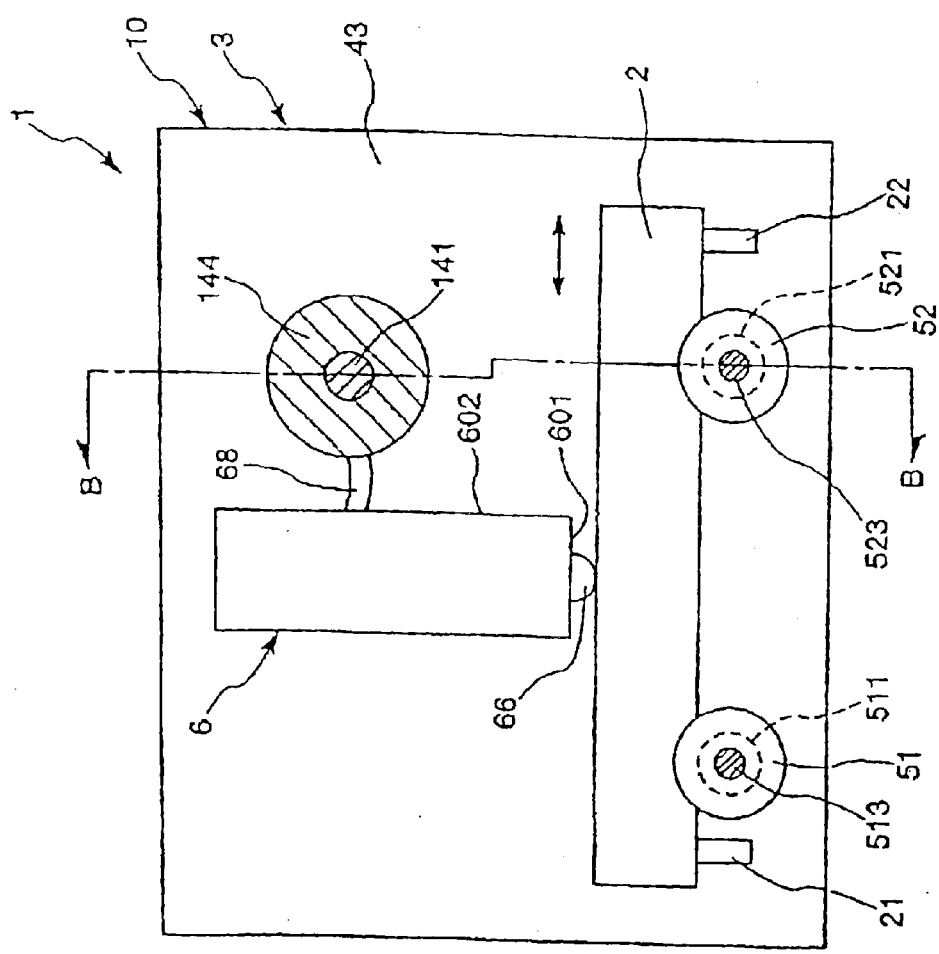
FIG. 10 is a cross-sectional plan view showing a fourth embodiment of the linear actuator according to the present invention.
Figure 11:
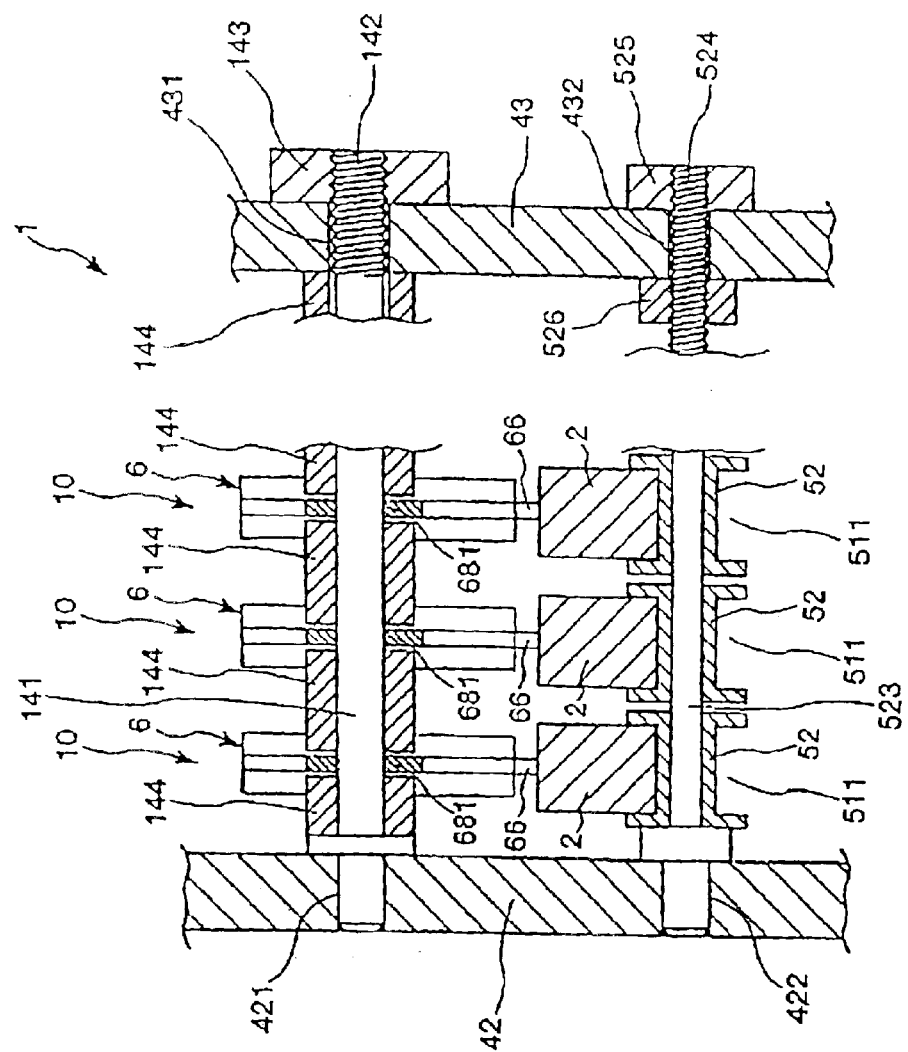
FIG. 11 is a cross-sectional view taken along the line B—B of the linear actuator shown in FIG. 10.

FIG. 10 is a cross-sectional plan view showing a fourth embodiment of the linear actuator according to the present invention. FIG. 11 is a cross-sectional view taken along the line B–B of the linear actuator shown in FIG. 10. In following explanations using FIG. 10, the upper side in FIG. 10 is referred to as "upper", the lower side is referred to as "lower", the right side is referred to as "right", and the left side is referred to as "left".

In the linear actuator 1 of the fourth embodiment described below, the description focuses on the points of difference with the first, second or third embodiment described above, and a description of the same items is omitted.

As shown in these drawings, the linear actuator 1 of the fourth embodiment has a plurality of plate-shaped actuator units 10.

In this case, the linear actuator 1 has a pair of facing plate-shaped bases 42, 43 arranged parallel to each other, and these bases 42, 43 are shared by each actuator unit 10. The base 42 is arranged at the left side end in FIG. 11, and the base 43 is arranged at the right side end in FIG. 11.

The actuator units 10 are constructed inside substantially parallel planes in a stacked arrangement.

Namely, in the actuator units 10, the directions of movement (arrangement directions) of the sliders 2 are substantially matched, and the sliders 2 are arranged so as to be stacked in the thickness direction of the vibrating element 6 (actuator units 10). Further, each slider 2 is arranged on one line in the horizontal direction in FIG. 11.

By stacking each actuator unit 10 in this way, it is possible to concentrate (integrate) the sliders 2.

Each vibrating element 6 is fixed to and supported by a common shaft 141 passing through the holes 681 of the arm portions 68.

Spacers 144 are respectively provided at positions corresponding to the holes 681 of the arm portions 68 between the adjoining vibrating elements 6, between the base 42 and the vibrating element 6 at left side end in FIG. 11, and between the base 43 and the vibrating element 6 at right side end in FIG. 11.

The left side end portion of the shaft 141 in FIG. 11 is fixed, for example, by pressure insertion, in a hole 421 formed in the base 42.

On the other hand, a screw 142 onto which a nut 143 is screwed is formed on the right side end portion of the shaft 141 in FIG. 11. The right side end portion of the shaft 141 in FIG. 11 is inserted through a hole 431 formed in the base 43, and by screwing the nut 143 onto the screw 142, the base 43 is held between a spacer 144 and the nut 143, whereby the shaft 141 is fixed to the base 43.

Further, each roller 52 is supported by a common shaft 523 which enables rotation in both the forward and reverse directions.

The left side end portion of the shaft 523 in FIG. 11 is fixed, for example, by pressure insertion, in a hole 422 formed in the base 42.

On the other hand, a screw 524 onto which two nuts 525 and 526 are screwed is formed on the right side end portion of the shaft 523 in FIG. 11. The right side end portion of the shaft 523 in FIG. 11 is inserted through a hole 432 formed in the base 43, and by screwing the nut 525 and the nut 526 onto the screw 524 with the base 43 interposed therebetween, the base 43 is held between the nut 525 and the nut 526, whereby the shaft 523 is fixed to the base 43.

In the same way, each roller 51 is supported by a common shaft 513 which enables rotation in both the forward and reverse directions.

The left side end portion of the shaft 513 in FIG. 11 is fixed, for example, by pressure insertion, in a hole (not shown in FIG. 11) formed in the base 42.

On the other hand, a screw (not shown in FIG. 11) onto which two nuts (not shown in FIG. 11) are screwed is formed on the right side end portion of the shaft 513 in FIG. 11. The right side end portion of the shaft 513 in FIG. 11 is inserted through a hole (not shown in FIG. 11) formed in the base 43, and by screwing the two nuts onto the screw with the base 43 interposed therebetween, the base 43 is held between the two nuts, whereby the shaft 513 is fixed to the base 43.

Here, because the structure and the operation of each actuator unit 10 are the substantially same as those of the first, second or third embodiments described above, a description thereof is omitted.

The linear actuator 1 of this fourth embodiment obtains the same results as the first, second or third embodiments described above.

In this case, in this linear actuator 1, because each actuator unit 10 is stacked in the thickness direction of the vibrating element 6, it is possible to make the linear actuator 1 more compact.

Further, in this linear actuator 1, because each actuator unit 10 is formed to have a plate shape (flat shape), they can be easily stacked (laminated), and this makes it possible to easily carry out assembly.

The linear actuator 1 in each of the embodiments described above can be installed and used in various electronic devices and the like.

Figure 12:
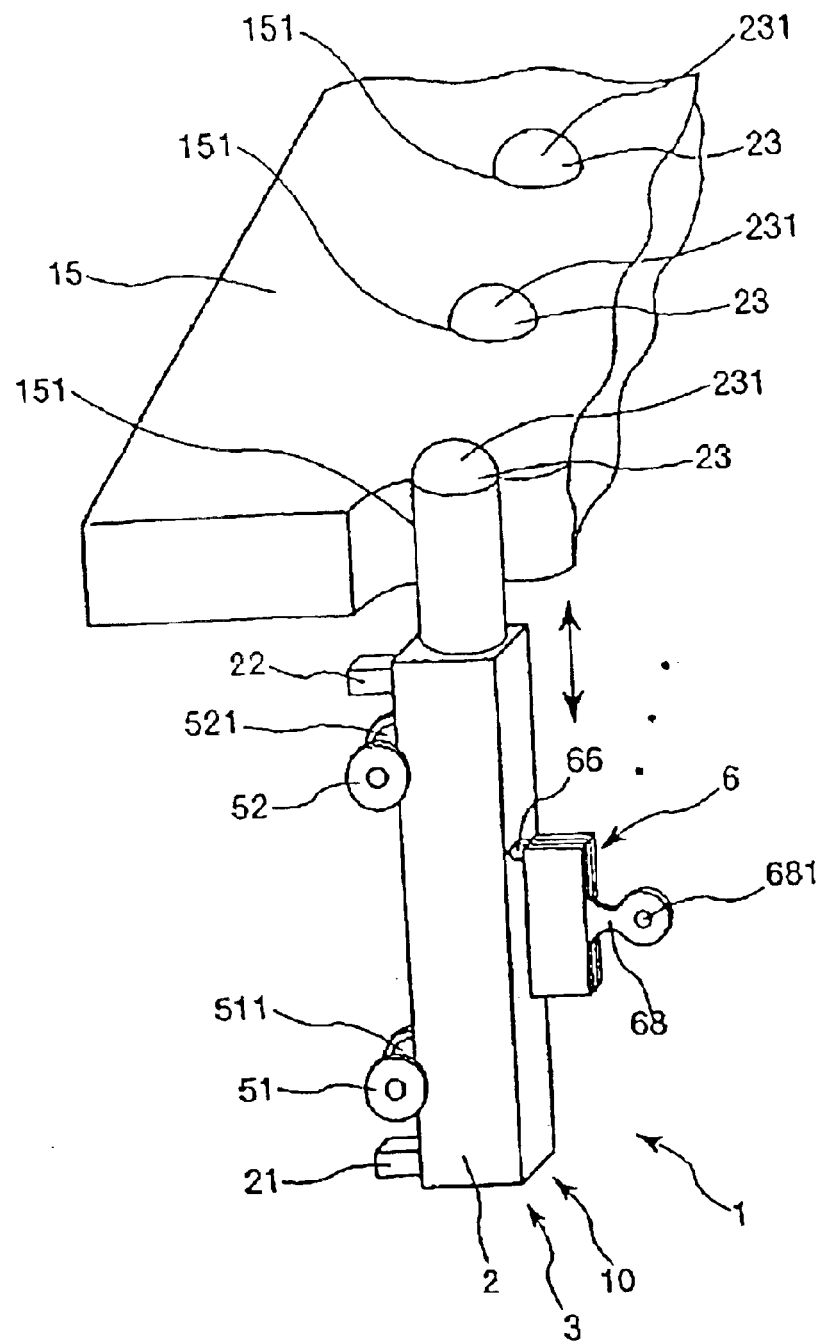
FIG. 12 is a perspective view showing a constituent example of the case where the linear actuator of the present invention is used to drive Braille in a Braille displaying apparatus.

For example, as shown in FIG. 12, the linear actuator 1 can be used to drive Braille in a Braille displaying apparatus.

The Braille displaying apparatus has a base plate 15, and a plurality of holes 151 are formed in the base plate 15. Each hole 151 is arranged to form Braille. Further, in FIG. 12, three holes 151 are arranged in a row (line).

The linear actuator 1 has a plurality of actuator units 10 like that in the fourth embodiment described above.

The slider 2 of each actuator unit 10 has a rod shape, and a pin 23 which forms one Braille dot is formed on the upper side end portion (tip portion) of each slider 2 in FIG. 12.

In the actuator units 10, the directions of movement of the sliders 2 are substantially matched like those in the fourth embodiment described above, and the sliders 2 are stacked in the thickness direction of the vibrating element 6 in an arrangement where the pins 23 are inserted in corresponding holes 151.

This linear actuator 1 is driven and controlled based on the Braille (Braille pattern) to be displayed, and in each actuator unit 10, when the slider 2 is moved upward in FIG. 12 by driving the vibrating element 6, tip portion 231 of the pin 23 protrudes from the hole 151, and in the reverse situation, when the slider 2 is moved downward in FIG. 12, the tip portion 231 of the pin 23 is retracted inside the hole 151.

In this regard, there is no particular limit to the use of the linear actuator of the present invention. Namely, the present invention can be applied to various electronic devices, such as for driving an antenna in a portable telephone (including a PHS), a portable television, a television telephone or the like, for example, except for driving the Braille.

Next, a fifth embodiment of a linear actuator of the present invention will be described.

Figure 13:
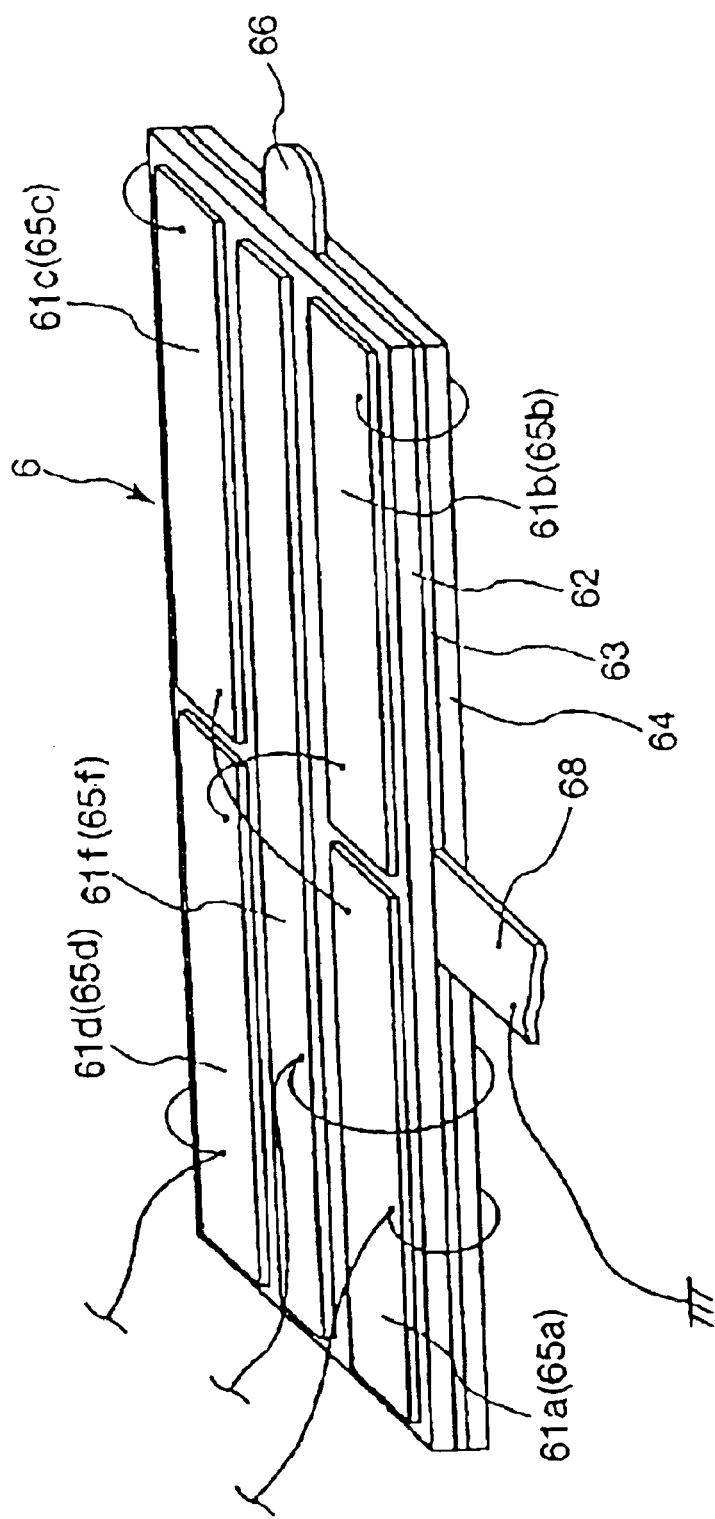
FIG. 13 is a perspective view showing a vibrating element according to a fifth embodiment of the linear actuator according to the present invention.

FIG. 13 is a perspective view showing a vibrating element according to a fifth embodiment of the linear actuator according to the present invention. In following explanations using FIG. 13, the upper side in FIG. 13 is referred to as "upper", the lower side is referred to as "lower", the right side is referred to as "right", and the left side is referred to as "left".

In the linear actuator 1 of the fifth embodiment described below, the description focuses on the points of difference with the first to fourth embodiments described above, and a description of the same items is omitted.

In addition to the first to fourth modes described in the second embodiment, the linear actuator 1 of the fifth embodiment is further equipped with a fifth mode and a sixth mode which combine vertical vibration and bending vibration. These modes can be freely selected by changing the conducting pattern to each of the electrodes 61a–61f, 65a–65f in the same way as the first to fourth modes.

The vibrating element 6 of this linear actuator 1 has an electrode 61f on the upper side of the piezoelectric element 62 in FIG. 13 and an electrode 65f on the lower side of the piezoelectric element 62 in FIG. 13 in place of the detecting electrodes 61e, 65e of the second embodiment. These electrodes 61f, 65f have rectangular plate shapes which have the substantially same dimension as the length of the vibrating element 6 in the longitudinal direction, and are arranged in a middle portion thereof along the longitudinal direction of the vibrating element 6. Further, the electrodes 61f and 65f are electrically connected on both sides (between the front face and the back face) of the vibrating element 6. Also, the electrodes 61f and 65f are electrically connected to the conducting circuit 20 side in the same way as the other electrodes 61a–61d, 65a–65d (not shown).

Figure 14:
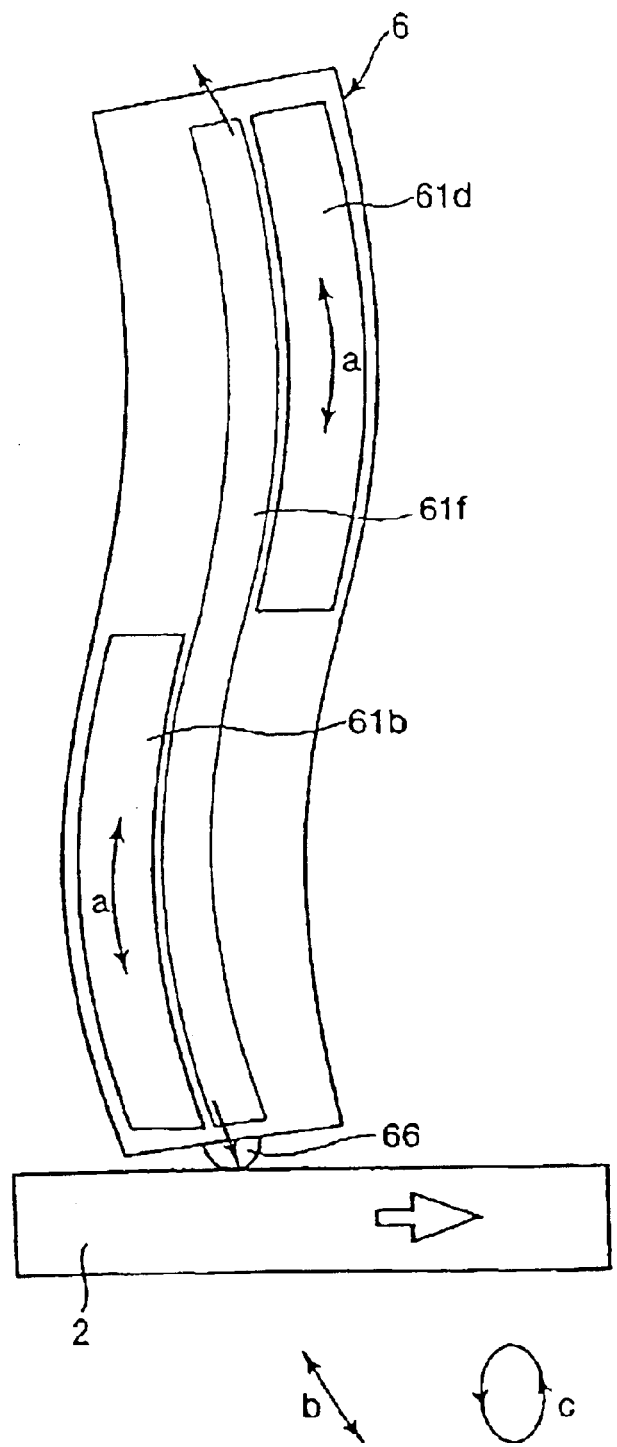
FIG. 14 is a plan view showing a state of the vibration of the vibrating element in the linear actuator shown in FIG. 13.

FIG. 14 is a plan view showing a state of the vibration of the vibrating element in the linear actuator shown in FIG. 13.

In the fifth mode of this linear actuator 1, electricity is conducted to the electrodes 61b, 61d, 65b and 65d positioned on the diagonal lines of the vibrating element 6, and an AC voltage is applied between each of these electrodes and the reinforcing plate 63. Then, the portions of the vibrating element 6 corresponding to these electrodes repeatedly undergo expansion and contraction, whereby the entire vibrating element 6 undergoes bending vibration. This bending vibration makes the protruding portion 66 of the vibrating element 6 undergo vibration (reciprocate) in a slanting direction shown by the arrow b in FIG. 14, or undergo elliptical vibration (elliptical movement) as shown by the arrow c. In this way, the slider 2 receives the repeating frictional force (pushing force) from the protruding portion 66, and is moved to the right side (in the forward direction) in FIG. 14.

Further, in this fifth mode, electricity is also conducted to the electrodes 61f and 65f in the middle portion of the vibrating element 6. Then, the applied AC voltage makes the corresponding portions of the vibrating element 6 repeatedly undergo expansion and contraction, whereby the entire vibrating element 6 undergoes vertical vibration at minute amplitude in the longitudinal direction. This vertical vibration increases the pushing force applied to the slider 2 by the protruding portion 66 of the vibrating element 6, whereby the slider 2 is moved by force stronger than that in the third mode. Thus, there is an advantage of enhancing driving force of the linear actuator 1.

Here, in this fifth mode, the electrodes 61a, 61c, 65a and 65c that are not conducting electricity constitute vibration detecting means for detecting the vibration of the vibrating element 6. When the linear actuator 1 is driven, these electrodes detect the voltage (induced voltage) induced between the reinforcing plate 63 and each of the conducting electrodes 61b, 61d, 61f, 65b, 65d and 65f, and such detected voltage is inputted to the oscillating circuit 81. Then, based on such detected voltage, the oscillating circuit 81 outputs an AC voltage having a frequency (resonance frequency) at which the amplitude of the vibrating element 6 becomes maximum, namely, the detected induced voltage becomes maximum. Thus, there is an advantage that the slider 2 can be moved with good efficiency. In this regard, the operation of the electrodes 61a, 61c, 65a and 65c which are not conducting electricity is the same as those of the first embodiment.

Figure 15:
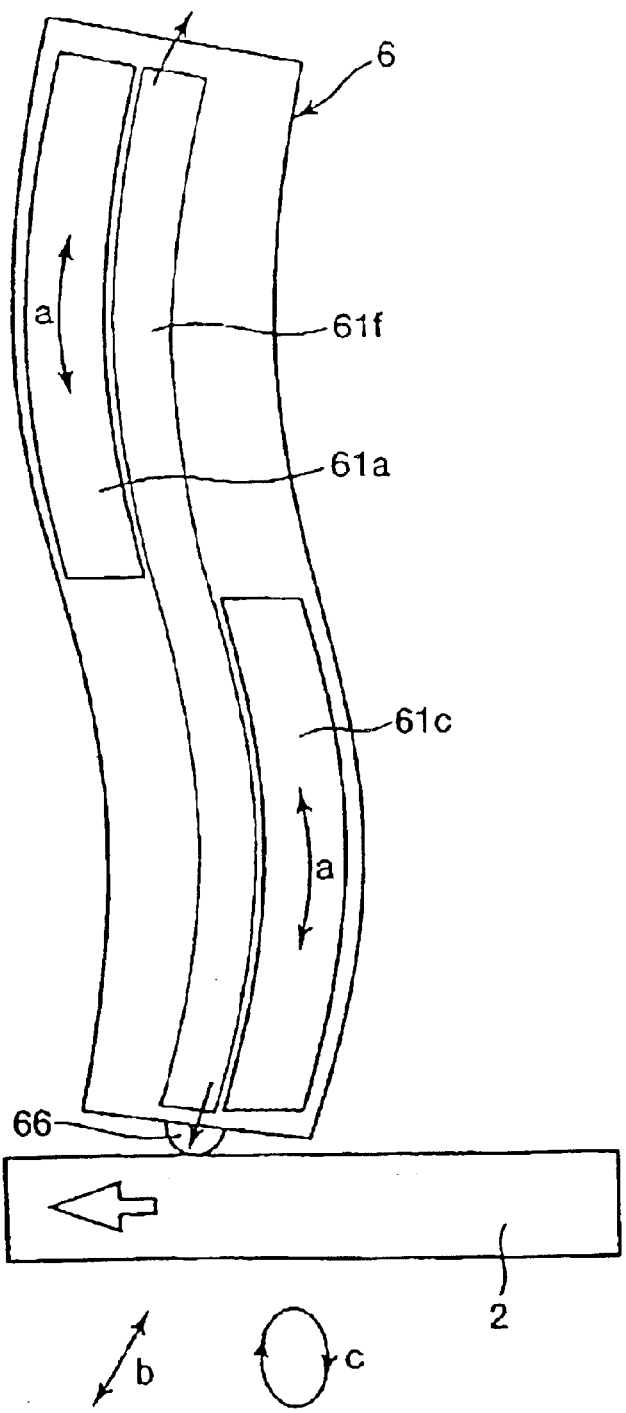
FIG. 15 is a plan view showing a state of the vibration of the vibrating element in the linear actuator shown in FIG. 13.

FIG. 15 is a plan view showing a state of the vibration of the vibrating element in the linear actuator shown in FIG. 13.

In the sixth mode of this linear actuator 1, electricity is conducted to the electrodes 61a, 61c, 65a and 65c positioned on the diagonal lines of the vibrating element 6, and electricity is conducted to the electrodes 61f and 65f in the middle portion of the vibrating element 6. Then, the vibrating element 6 vibrates symmetrically with (contrary to) the fifth mode, and this slides the slider 2 to the left side (in the reverse direction) in FIG. 15. In this way, there is an advantage that great driving force is obtained for the movement of the slider 2 in the reverse direction. In this case, the other electrodes 61b, 61d, 65b and 65d which are not conducting electricity constitute vibration detecting means for detecting the vibration of the vibrating element 6. These operations and effects are as same as those of the electrodes 61a, 61c, 65a and 65c in the fifth mode.

Further, in this linear actuator 1, the arm portion 68 supports a vibrational node of both the vertical vibration and the bending vibration at the driving time, which is at a lateral side of the vibrating element 6. A proper determination of this position of the vibrational node may be carried out by vibration analysis or other known methods within the scope obvious to those skilled in the relevant art. For example, in the case where the electrodes 61a–61d, 65a–65d are provided symmetrically in the longitudinal direction and the lateral direction of the vibrating element 6, the portion substantially near the middle of the vibrating element 6 constitute a vibrational node. If the arm portion 68 is provided at such position, because it is possible to suppress vibration leakage (vibrational waste) to the outside from the arm portion 68, there is an advantage that it is possible to efficiently drive the slider 2.

Further, in this linear actuator 1, the reinforcing plate 63, the protruding portion 66 and the arm portion 68 are preferably formed integrally by one member. In this way, because the bonding connection of these components can be strengthened, it is possible to transmit the vibration of the vibrating element 6 efficiently to the slider 2, and there is an advantage that it is possible to support the vibrating element 6 more reliably.

Furthermore, each of these deformation examples may be applied to the linear actuator 1 of the first to fourth embodiments.

Figure 16:
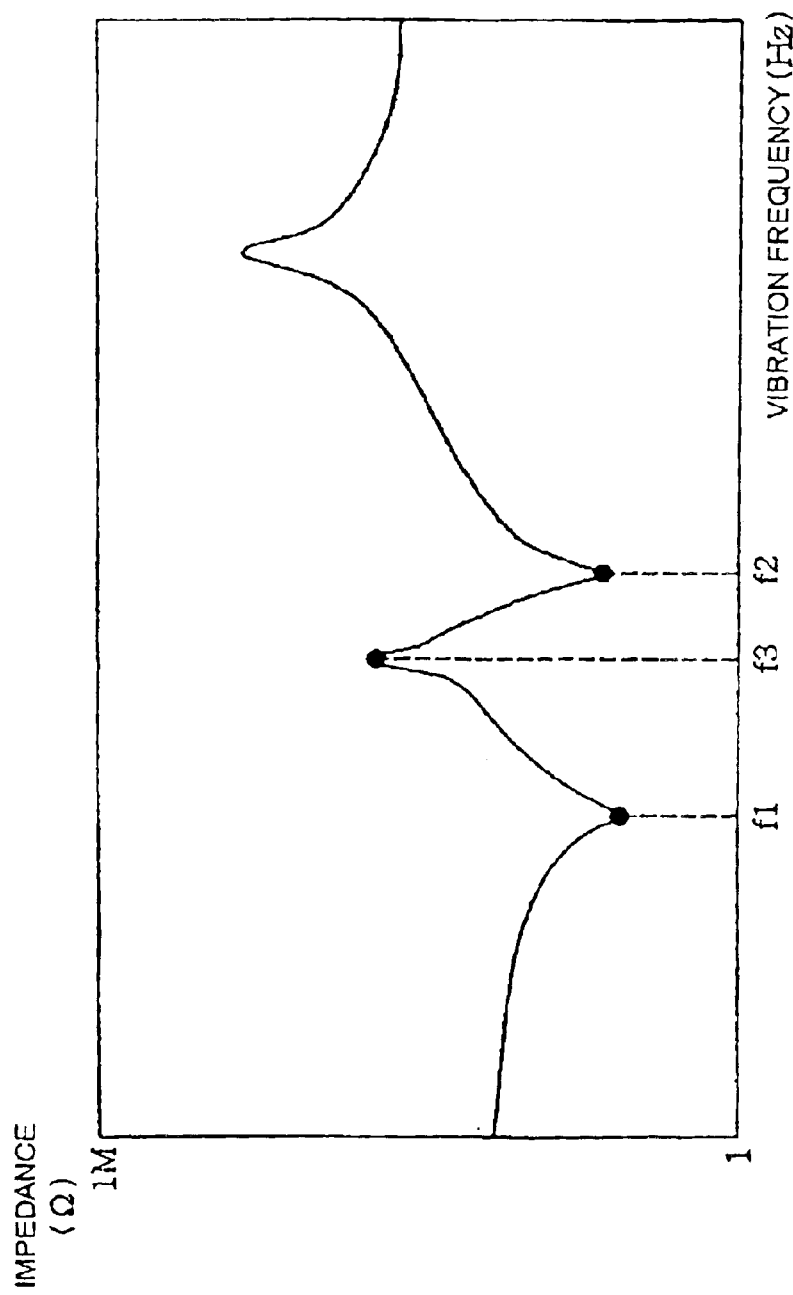
FIG. 16 is a graph showing a driving characteristic of the vibrating element in the linear actuator shown in FIG. 13.

FIG. 16 is a graph showing a driving characteristic of the vibrating element in the linear actuator shown in FIG. 13.

In the vibration characteristics of the vibrating element 6 shown in this graph, the horizontal axis represents vibration frequency (Hz), and the vertical axis represents impedance (ohm). Further, this vibration frequency is the vibration frequency of the vibrating element 6 at the driving time. Further, the impedance is the impedance of the piezoelectric elements 62, 64 in the state where there is no pushing.

In this linear actuator 1, by combining the vertical vibration and the bending vibration as described above, the slider 2 is biased by the protruding portion 66 of the vibrating element 6 with greater pushing force. In this regard, in this linear actuator 1, the various conditions of the vibrating element 6 are set so that the resonance frequency f1 of the vertical vibration of the vibrating element 6 and the resonance frequency f2 of the bending vibration are different (shifted). In this way, near the resonance point in the pushing state, the change in the impedance of the piezoelectric elements 62, 64 becomes smaller, and the impedance becomes larger, whereby the resonance frequencies of the vertical vibration and the bending vibration become unclear. Thus, it is possible to excite combined vertical vibration and bending vibration in a wide frequency band, and there is an advantage that it is possible to stabilize the power supplied at the time the vibrating element 6 is driven.

In this regard, these resonance frequencies f1, f2 are the vibration frequencies (driving frequencies) at the time the impedance becomes very small (see FIG. 16).

Further, in this linear actuator 1, the vibrating element 6 is driven at a desired vibration frequency (driving frequency) between the resonance frequency f1 of the vertical vibration and the resonance frequency f2 of the bending vibration.

In this case, when the driving frequency of the vibrating element 6 approaches the resonance frequency f1 of the vertical vibration, because the vibration amplitude in the direction where the pushing force is increased becomes larger, the frictional force between the slider 2 and the protruding portion 66 of the vibrating element 6 becomes greater, and this creates greater driving force (i.e., this forms greater driving force system).

Further, when the driving frequency of the vibrating element 6 approaches the resonance frequency f2 of the bending vibration, the component of the vibration displacement of the protruding portion 66 of the vibrating element 6 in the direction of movement of the slider 2 becomes larger, whereby the amount transmitted by a single vibration by the vibrating element 6 becomes larger, and this creates a higher driving speed (moving speed) (i.e., this forms a high-speed system).

In this way, by shifting the resonance frequency f1 of the vertical vibration and the resonance frequency f2 of the bending vibration, and by properly establishing (selecting) the driving frequency in the frequency band between f1 and f2, it is possible to obtain any driving characteristics related to the driving force and the driving speed, for example.

Further, in this linear actuator 1, the resonance frequency f2 of the bending vibration is preferably larger than the resonance frequency f1 of the vertical vibration by about 0.5 to 3% of the frequency f1, and more preferably f2 is larger by about 1 to 2% of the frequency f1.

By establishing the difference between the resonance frequency f1 of the vertical vibration and the resonance frequency f2 of the bending vibration within the range described above, because vertical vibration and bending vibration occur (i.e., they are combined) at the same time in the pushing state, frictional force and driving force are obtained at the same time, and this makes it possible to obtain good driving characteristics.

Further, instead of being limited to this, the resonance frequency f1 of the vertical vibration may be made larger than the resonance frequency f2 of the bending vibration. In this case, the resonance frequency f1 of the vertical vibration is preferably larger than the resonance frequency f2 of the bending vibration by about 0.5 to 3% of f2, and more preferably f1 is larger by about 1 to 2%. Furthermore, in order to supply a larger power and obtain a large mechanical output, the impedance is preferably lowered in the driving frequency. Namely, any arrangement may be used so long as the resonance frequencies f1, f2 are not the same.

Further, in this linear actuator 1, the impedance at the resonance frequency f2 of the bending vibration is larger than the impedance at the resonance frequency f1 of the vertical vibration, and there is a frequency f3 having very large impedance between the resonance frequencies f1 and f2. In this regard, the vibrating element 6 is preferably driven at a desired driving frequency between the resonance frequency f1 of the vertical vibration and the resonance frequency f2 of the bending vibration, and is more preferably driven at a desired driving frequency between the frequencies f3 and f2.

In this way, it is possible to excite vertical vibration and bending vibration at shifted vibration phases at the time the vibrating element 6 is driven. Accordingly, it is possible to vibrate the protruding portion 66 along an elliptical path c (see FIGS. 14 and 15), and this makes it possible to apply force with good efficiency to the slider 2 from the vibrating element 6 without any restoring force being applied to the slider 2.

As described above, in this fifth embodiment, the linear actuator 1 can be operated efficiently.

Next, a sixth embodiment of a linear actuator of the present invention will be described.

Figure 17:
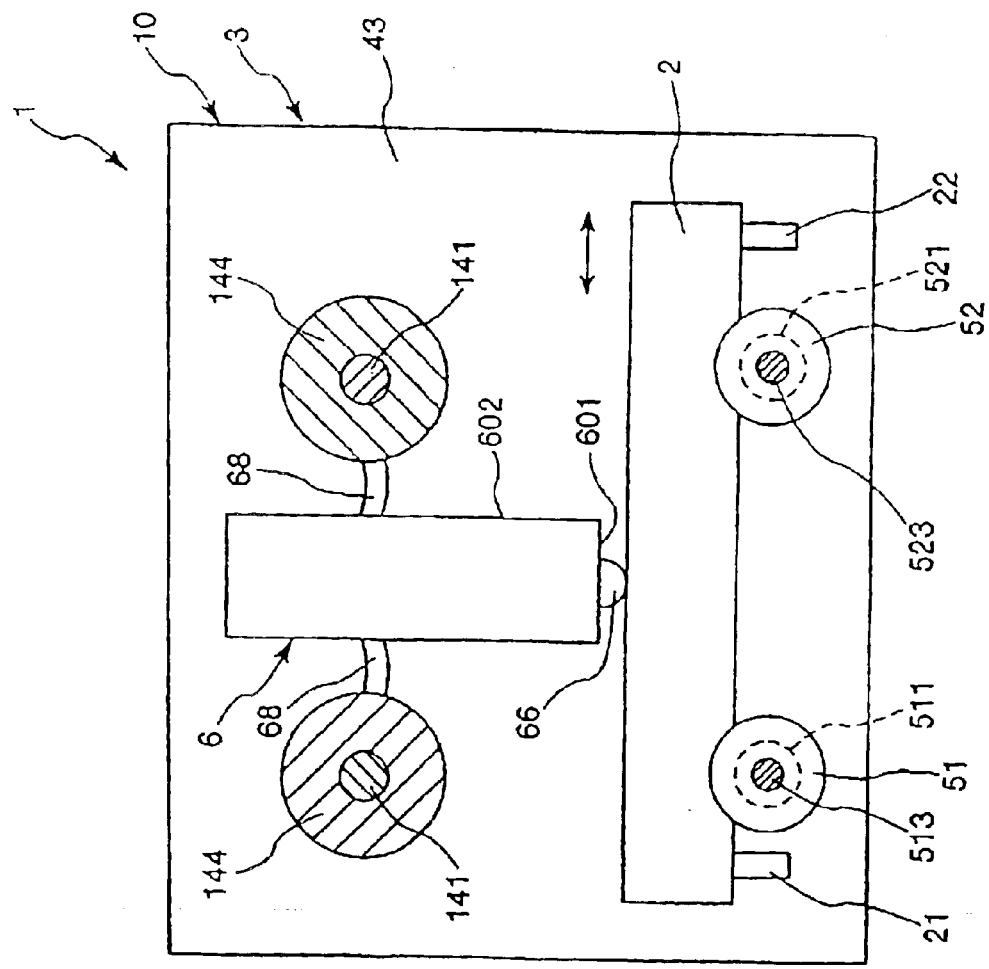
FIG. 17 is a cross-sectional plan view showing a sixth embodiment of the linear actuator according to the present invention.

FIG. 17 is a cross-sectional plan view showing a sixth embodiment of the linear actuator according to the present invention. In following explanations using FIG. 17, the upper side in FIG. 17 is referred to as "upper", the lower side is referred to as "lower", the right side is referred to as "right", and the left side is referred to as "left".

In the linear actuator 1 of the sixth embodiment described below, the description focuses on the points of difference with the fourth embodiment described above, and a description of the same items is omitted.

As shown in FIG. 17, in the linear actuator 1 of the sixth embodiment, one pair of (two) elastic (flexible) arm portions 68 are integrally formed on the reinforcing plate 63 of the vibrating element 6 of the actuator unit 10.

The pair of arm portions 68 are provided in the substantially middle of the longitudinal direction (the upper-and-lower direction in FIG. 17) of the reinforcing plate 63 so as to protrude in mutually opposite directions (symmetrically in FIG. 17) with respect to the reinforcing plate 63 (the vibrating element 6), and these directions are substantially perpendicular to the longitudinal direction of the reinforcing plate 63, which is interposed therebetween.

The linear actuator 1 of this sixth embodiment obtains the same results as the fourth embodiment described above.

Further, in this linear actuator 1, because one pair of arm portions 68 is provided on the vibrating element 6, there is high rigidity for support, and this makes it possible to obtain stable support even against external force of the reaction of driving and the like. Furthermore, because the arm portions 68 are symmetrical, it is possible to uniformize effect on the driving characteristics in the right direction and the driving characteristics in the left direction, and this makes it possible to obtain a linear actuator having the same characteristics in the left and right directions (forward and reverse directions).

Here, in this sixth embodiment, the number of actuator units 10 in the linear actuator 1 is a plural number, but in the present invention, the number of actuator units 10 may be one.

Further, the fifth embodiment described above may be applied to this sixth embodiment.

In the descriptions given above, it should be noted that the linear actuator of the present invention was described based on the embodiments shown in the drawings, but the present invention is not limited to them, and it is possible to replace the structure of each portion with any structure having the same or similar function.

Further, in the present invention, two or more of the structures (features) of any of the embodiments described above may be appropriately combined.

Further, in the present invention, the shape and structure of the vibrating element is not limited to the structures shown in the drawings, and it is possible to use other structures such as structures which have only one piezoelectric element, structures which do not have a reinforcing plate, structures having a shape in which the width gradually decreases toward the portion in contact with the slider, and the like.

Further, in the embodiments described above, one vibrating element 6 was provided in one actuator unit 10, but in the present invention, a plurality of vibrating elements 6 may be provided in one actuator unit 10.

INDUSTRIAL APPLICATION

In accordance with the present invention, because the slider is moved using a vibrating element, namely, because the slider is directly driven using a vibrating element, and because the slider is supported by a plurality of rollers, it is possible to reduce the frictional resistance, and this makes it possible to linearly move the slider smoothly and reliably. Further, by using a vibrating element to move the slider, namely, by using a vibrating element to linearly drive the slider, the entire linear actuator can be made compact and particularly thin. Also, the structure of the linear actuator can be simplified, and this makes it possible to reduce the manufacturing cost. Further, because an ordinary motor is not used, it is possible to completely eliminate electromagnetic noise, or even when there is electromagnetic noise, because such noise is small, it is possible to prevent such noise from having an effect on peripheral devices. Accordingly, the present invention has wide application to industry.

What is claimed is:

1. A linear actuator having at least one actuator unit, the actuator unit comprising:
    a slider;
    a plurality of rollers for movably supporting the slider; and
    a vibrating element abutting on the slider to make frictional contact with the slider, the vibrating element comprising:
        a reinforcing plate;
        a first piezoelectric element mounted to a first side of the reinforcing plate;
        a second piezoelectric element mounted to a second side of the reinforcing plate opposite the first side;
    wherein the vibrating element is vibrated when an AC voltage is applied to at least one of the first piezoelectric element and the second piezoelectric element so that the vibration repeatedly applies force to the slider to move the slider lineally.

2. The linear actuator according to claim 1, wherein the at least one actuator unit includes a plurality of actuator units.

3. The linear actuator according to claim 2, wherein the plurality of actuator units are respectively provided in substantially parallel planes in a stacked arrangement.

4. The linear actuator according to claim 2, further comprising:
    at least one common shaft for rotatably supporting the rollers of the actuator units; and
    at least one common shaft for supporting the vibrating elements of the actuator units.

5. The linear actuator according to claim 1, wherein the vibrating element has vibrating patterns which comprise a plurality of vibrating modes including a first mode in which the slider is maintained in a suspended state; a second mode in which the slider is allowed to be moved; a third mode in which the slider is moved in a forward direction; and a fourth mode in which the slider is moved in a reverse direction, wherein any one mode can be selected from the first mode, the second mode, the third mode, and the fourth mode by changing the vibrating pattern of the vibrating element.

6. The linear actuator according to claim 1, wherein the vibrating element has vibrating patterns which comprise a plurality of vibrating modes including a first mode in which the slider is maintained in a suspended state; a second mode in which the slider is allowed to be moved; a third mode in which the slider is moved in a forward direction; and a fourth mode in which the slider is moved in a reverse direction, and the vibrating element has a plurality of divided electrodes so that the vibrating element is vibrated when an AC voltage is applied to the at least one piezoelectric element through the electrodes, wherein any one mode can be selected from the first mode, the second mode, the third mode, and the fourth mode by changing patterns of application of the AC voltage to each of the electrodes of the vibrating element.

7. The linear actuator according to claim 1, further comprising at least one shaft positioned at the center of a corresponding roller for rotatably supporting the roller, wherein the slider is positioned in a groove to be supported by the roller, and the diameter of the shaft is smaller than a portion of the roller on which the slider is supported.

8. The linear actuator according to claim 1, wherein the slider has a sliding portion and the sliding portion is rod-shaped or plate-shaped.

9. The linear actuator according to claim 8, wherein the vibrating element is plate-shaped, and the vibrating element and the slider are positioned in a substantially same plane.

10. The linear actuator according to claim 1, wherein the vibrating element is constituted from a laminated body which includes the at least one plate-shaped piezoelectric element and the reinforcing plate is made of metal material.

11. The linear actuator according to claim 10, wherein the vibrating element has an arm portion projectingly provided from the vibrating element to support the vibrating element, the vibrating element is pushed into contact with the slider by the arm portion, the vibrating element has a portion abutting on the slider, and the arm portion and the abutting portion are formed integrally on the reinforcing plate.

12. The linear actuator according to claim 10, further comprising pushing means for pushing the vibrating element into contact with the slider;
wherein the vibrating element has an arm portion projectingly provided from the vibrating element to support the vibrating element, the vibrating element has a portion abutting on the slider, and at least a part of the pushing means, the arm portion, and the abutting portion are formed integrally on the reinforcing plate.

13. The linear actuator according to claim 12, wherein the pushing means has an adjustment mechanism that adjusts force pushing the vibrating element against the slider, and at least a part of the adjustment mechanism is formed integrally on the reinforcing plate.

14. The linear actuator according to claim 1, wherein the vibrating element has a portion abutting on the slider, the abutting portion is positioned between two rollers of the plurality of rollers in a direction of movement of the slider.

15. The linear actuator according to claim 1, wherein the slider has a resonance frequency of bending vibration, and the linear actuator is constructed so that there is substantially no match between the resonance frequency of the bending vibration of the slider and the m'th multiple of the frequency of the vibration of the vibrating element (where m is all of the natural numbers), and that there is substantially no match between the m'th multiple of the resonance frequency of the bending vibration of the slider and the frequency of the vibration of the vibrating element (where n is all of the natural numbers).

16. The linear actuator according to claim 1, further comprising movement restricting means for restricting movement of the slider.

17. The linear actuator according to claim 16, wherein the movement restricting means is provided on the slider, and includes at least one protruding portion that restricts the movement of the slider by abutting on the roller.

18. A linear actuator having at least one actuating unit, the actuating unit comprising:
a slider;
a plurality of rollers for movably supporting the slider; and
a vibrating element abutting on the slider to make frictional contact with the slider, the vibrating element having at least one piezoelectric element;
wherein the vibrating element is vibrated when an AC voltage is applied to at least one piezoelectric element so that the vibration repeatedly applies force to the slider to move the slider lineally;
wherein the vibrating element is constituted from a laminated body that includes the at least one plate-shaped piezoelectric element and at least one reinforcing plate made of metal material; and
wherein the vibrating element has a arm portion projectingly provided from the vibrating element to support the vibrating element, the vibrating element is pushed into contact with the slider by the arm portion, the vibrating element has a portion abutting on the slider, and the arm portion and the abutting portion are formed integrally on the reinforcing plate.

19. A linear actuator having at least one actuating unit, the actuating unit comprising:
a slider;
a plurality of rollers for movably supporting the slider; and
a vibrating element abutting on the slider to make frictional contact with the slider, the vibrating element having at least one piezoelectric element;
wherein the vibrating element is vibrated when an AC voltage is applied to at least one piezoelectric element so that the vibration repeatedly applies force to the slider to move the slider lineally;
wherein the vibrating element has a portion abutting on the slider, the abutting portion is positioned between two rollers of the plurality of rollers in a direction of movement of the slider.

20. A linear actuator comprising:
an actuator body having a base plate;
a pushing assembly mounted to the base plate;
a vibrating element mounted to the base plate by the pushing device;
a plurality of rollers mounted to the base plate;
a slider supported by the rollers and movable along the rollers in a plane parallel to the base;
wherein the pushing device biases the vibrating element in contact with the slider;
wherein movement of the vibrating element moves the slider along the rollers in a plane parallel to the base;

wherein the pushing assembly, the vibrating element, the rollers, and the slider extend substantially the same distance from the base plate and are in substantial vertical alignment with each other in relation to a vertically orientated surface of the base plate to form a compact assembly.

* * * * *